US011770279B2

(12) United States Patent
Noh et al.

(10) Patent No.: US 11,770,279 B2
(45) Date of Patent: *Sep. 26, 2023

(54) METHOD, APPARATUS, AND SYSTEM FOR ACCESSING UNLICENSED BAND CHANNEL

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,758

(22) Filed: Nov. 2, 2022

(65) Prior Publication Data

US 2023/0128601 A1    Apr. 27, 2023

Related U.S. Application Data

(63) Continuation of application No. 17/342,230, filed on Jun. 8, 2021, now Pat. No. 11,646,922, which is a
(Continued)

(30) Foreign Application Priority Data

Jan. 20, 2016  (KR) .................. 10-2016-0007301
Feb. 3, 2016   (KR) .................. 10-2016-0013755
(Continued)

(51) Int. Cl.
*H04W 4/00*     (2018.01)
*H04L 27/26*    (2006.01)
(Continued)

(52) U.S. Cl.
CPC ........ *H04L 27/2602* (2013.01); *H04L 1/1812* (2013.01); *H04L 5/0051* (2013.01);
(Continued)

(58) Field of Classification Search
CPC . H04W 72/23; H04W 16/14; H04W 74/0833; H04L 27/2602; H04L 27/26; H04L 5/001
See application file for complete search history.

(56) References Cited

U.S. PATENT DOCUMENTS 10,674,541 B2 *  6/2020  Bhorkar ............... H04W 72/23
2014/0341207 A1  11/2014  Bhushan et al.
(Continued)

FOREIGN PATENT DOCUMENTS

WO    2017/126926    7/2017

OTHER PUBLICATIONS

Hearing Notice dated Nov. 29, 2022 for Indian Patent Application No. 201827026878.
(Continued)

*Primary Examiner* — Abdelnabi O Musa
(74) *Attorney, Agent, or Firm* — Ladas & Parry, LLP

(57) ABSTRACT

A base station and a user equipment of a wireless communication system are disclosed. Each of the base station and the user equipment of the wireless communication includes a communication module; and a processor. The processor is configured to receive signaling information related to the start of uplink (UL) transmission from the base station through the communication module. The processor is configured to determine whether to perform a UL transmission using a partial subframe based on the signaling information. When the processor performs the UL transmission using the partial subframe, the processor is configured to determine a symbol configuration of the partial subframe based on the signaling information and perform, through the communi-
(Continued)

cation module, the UL transmission using the partial subframe according to the symbol configuration. At this time, the partial subframe is a subframe which occupies less than 14 symbols.

18 Claims, 34 Drawing Sheets

Related U.S. Application Data continuation of application No. 16/033,153, filed on Jul. 11, 2018, now Pat. No. 11,064,364, which is a continuation of application No. PCT/KR2017/000706, filed on Jan. 20, 2017.

(30) Foreign Application Priority Data

| Feb. 4, 2016 | (KR) | ........................ 10-2016-0014521 |
| Apr. 18, 2016 | (KR) | ......................... 10-2016-0046914 |

(51) Int. Cl.
| H04L 5/00 | (2006.01) |
| H04W 72/23 | (2023.01) |
| H04L 1/1812 | (2023.01) |
| H04W 16/14 | (2009.01) |
| H04W 74/08 | (2009.01) |
| H04L 5/14 | (2006.01) |
| H04L 1/1867 | (2023.01) |

(52) U.S. Cl.
CPC .......... *H04L 5/0053* (2013.01); *H04L 5/0092* (2013.01); *H04L 27/26* (2013.01); *H04W 16/14* (2013.01); *H04W 72/23* (2023.01); *H04W 74/0833* (2013.01); *H04L 1/1887* (2013.01); *H04L 5/001* (2013.01); *H04L 5/1469* (2013.01); *H04W 74/0808* (2013.01)

(56) References Cited

U.S. PATENT DOCUMENTS

| 2015/0098437 | A1 | 4/2015 | Chen et al. |
| 2015/0195849 | A1 | 7/2015 | Bashar et al. |
| 2016/0014753 | A1 | 1/2016 | Wu et al. |
| 2016/0309467 | A1* | 10/2016 | Yerramalli ........ H04W 72/0446 |
| 2017/0126300 | A1* | 5/2017 | Park ...................... H04L 5/0048 |
| 2017/0223677 | A1 | 8/2017 | Dinan et al. |
| 2017/0230945 | A1 | 8/2017 | Babaei et al. |
| 2017/0257775 | A1* | 9/2017 | Jiang ................. H04W 72/1268 |
| 2017/0289818 | A1* | 10/2017 | Ng ......................... H04L 5/0053 |
| 2018/0278403 | A1 | 9/2018 | Yerramalli et al. |
| 2018/0323935 | A1 | 11/2018 | Yerramalli et al. |
| 2018/0332478 | A1 | 11/2018 | Noh et al. |
| 2019/0053274 | A1 | 2/2019 | Kim et al. |
| 2019/0230574 | A1* | 7/2019 | Novlan ............... H04L 27/0006 |
| 2019/0313450 | A1* | 10/2019 | Mukherjee ............ H04W 16/14 |
| 2019/0327117 | A1* | 10/2019 | Jeon ....................... H04L 5/0094 |
| 2021/0306862 | A1 | 9/2021 | Noh et al. |

OTHER PUBLICATIONS

International Search Report for PCT/KR2017/000706 dated Apr. 25, 2017 and its English translation from WIPO (published as WO 2017/126926).
Written Opinion of the International Searching Authority for PCT/KR2017/000706 dated Apr. 25, 2017 and its English machine translation by Google Translate (published as WO 2017/126926).
International Preliminary Report on Patentability (Chapter I) for PCT/KR2017/000706 dated Jul. 24, 2018 and its English translation from WIPO (published as WO 2017/126926).
Samsung, "Discussion on LBT for UL Transmission", R1-156768, 3GPP TSG RAN WG1 Meeting #83, Anaheim, USA, Nov. 7, 2015. See sections 2.1.1, 2.1.2, 2.4.1.
CATT, "Design of UL LBT for LAA", R1-156575, 3GPP TSG RAN WG1 Meeting #83, Anaheim, USA, Nov. 7, 2015. See sections 1-3.
Panasonic, "Indication Methods for Partial Subframe", R1-156958, 3GPP TSG RAN WG1 Meeting #83, Anaheim, USA, Nov. 5, 2015. See sections 1-4.
Office Action dated Mar. 25, 2021 for Indian Patent Application No. 201827026878.
Notice of Allowance dated Apr. 7, 2021 for U.S. Appl. No. 16/033,153 (now published as US 2018/0332478).
Office Action dated Nov. 4, 2020 for U.S. Appl. No. 16/033,153 (now published as US 2018/0332478).
Final Office Action dated Jun. 15, 2020 for U.S. Appl. No. 16/033,153 (now published as US 2018/0332478).
Office Action dated Jan. 14, 2020 for U.S. Appl. No. 16/033,153 (now published as US 2018/0332478).
Office Action dated Aug. 2, 2019 for U.S. Appl. No. 16/033,153 (now published as US 2018/0332478).
Office Action for Korean Patent Application No. 10-2018-7019864 dated Jun. 30, 2021 and its English translation provided by Applicant's foreign counsel.
Fujitsu: "Evaluation results for DL+UL LAA and Wi-Fi", 3GPP TSG RAN WG1 Meeting #81, R1-153541, Fukuoka, Japan, May 25-29, 2015, pp. 1-5.
Huawei, HiSilicon: "Downlink Signaling for LAA transmission burst related information", 3GPP TSG RAN WG1 Meeting #83, R1-156904, Anaheim, USA, Nov. 15-22, 2015, pp. 1-10.
Notice of Allowance dated Nov. 12, 2021 for Korean Patent Application No. 10-2018-7019864 and its English translation provided by Applicant's foreign counsel.
ETRI: "Discussion on the UL LBT for LAA", 3GPP TSG RAN WG1 Meeting #81, R1-153001, Fukuoka, Japan, May 25-29, 2015, pp. 1-9.
Samsung: "Discussion on LBT for UL transmission", 3GPP TSG RAN WG1 Meeting #82bis, R1-155461, Malmö, Sweden, Oct. 5-9, 2015, pp. 1-5.
Notice of Allowance dated Aug. 3, 2022 for U.S. Appl. No. 17/342,230 (now published as US 2021/0306862).

\* cited by examiner

METHOD, APPARATUS, AND SYSTEM FOR ACCESSING UNLICENSED BAND CHANNEL

CROSS-REFERENCE TO RELATED APPLICATIONS

This application is a continuation of U.S. patent application Ser. No. 17/342,230 filed on Jun. 8, 2021, which is a continuation of U.S. patent application Ser. No. 16/033,153 filed on Jul. 11, 2018, now issued as U.S. Pat. No. 11,064,364 dated Jul. 13, 2021, which is a continuation of International Patent Application No. PCT/KR2017/000706 filed on Jan. 20, 2017, which claims the priority to Korean Patent Application No. 10-2016-0007301 filed in the Korean Intellectual Property Office on Jan. 20, 2016, Korean Patent Application No. 10-2016-0013755 filed in the Korean Intellectual Property Office on Feb. 3, 2016, Korean Patent Application No. 10-2016-0014521 filed in the Korean Intellectual Property Office on Feb. 4, 2016, and Korean Patent Application No. 10-2016-0046914 filed in the Korean Intellectual Property Office on Apr. 18, 2016, the entire contents of which are incorporated herein by reference.

TECHNICAL FIELD

The present invention relates to a wireless communication system. Specifically, the present invention relates to a method, apparatus, and system for accessing a channel in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

It is an object of the present invention to provide a method and apparatus for efficiently transmitting a signal in a wireless communication system, in particular, a cellular wireless communication system. It is another object of the present invention to provide a method and apparatus for efficiently transmitting a signal in a specific frequency band (e.g., unlicensed band). In particular, it is an object of the present invention to provide a method and apparatus for efficiently sharing a channel, and sensing and detecting a channel in a specific frequency band.

The technical object of the present invention is not limited to the above technical objects, and other technical problems that are not mentioned will be apparent to those skilled in the art from the following description.

Technical Solution

A user equipment of a wireless communication system according to an embodiment of the present invention includes a communication module; and a processor. The processor is configured to receive signaling information related to a start of UpLink (UL) transmission from a base station through the communication module and determine whether to perform a UL transmission using a partial subframe based on the signaling information, and when the user equipment performs the UL transmission using the partial subframe, determine a symbol configuration of the partial subframe based on the signaling information and perform, through the communication module, the UL transmission using the partial subframe according to the symbol configuration. The partial subframe may be a subframe which occupies less than 14 symbols.

The processor may be configured to determine a start time point of the UL transmission using the partial subframe based on the signaling information, and perform the UL transmission using the partial subframe according to the start time point of the UL transmission.

The signaling information includes information related to a start time point of a Listen Before Talk (LBT) procedure for the UL transmission using the partial subframe. The processor may be configured to determine a start time point of the LBT procedure based on the signaling information, and start an LBT procedure according to the start time point of the LBT procedure.

The processor may be configured to determine a position of a start symbol of the partial subframe within a subframe based on the signaling information.

The partial subframe may be a subframe in which the first symbol of a subframe is unoccupied.

The processor may be configured to determine a position of the last occupied symbol in the partial subframe within a subframe based on the signaling information.

The partial subframe may be a subframe in which the last symbol of a subframe is unoccupied.

The processor may be configured to perform rate matching for the UL transmission using the partial subframe based on the symbol configuration.

The processor may be configured to determine the number of symbols of the partial subframe according to the symbol configuration and perform rate matching according to the number of symbols.

The signaling information may be Downlink Control Information (DCI).

The DCI may be a UL grant indicating a UL transmission.

An operation method of a user equipment of a wireless communication system according to an embodiment of the present invention includes receiving signaling information related to a start of UpLink (UL) transmission from a base station; determining whether to perform UL transmission using a partial subframe based on the signaling information; and when performing the UL transmission using the partial subframe, determining a symbol configuration of the partial subframe based on the signaling information through the communication module and performing the UL transmission using the partial subframe according to the symbol configuration. The partial subframe may be a subframe which occupies less than 14 symbols.

The determining the symbol configuration of the partial subframe and the performing the UL transmission using the partial subframe according to the symbol configuration may include determining a start time point of the UL transmission using the partial subframe based on the signaling information, and performing the UL transmission using the partial subframe according to the start time point of the UL transmission.

The signaling information includes information related to a start time point of a Listen Before Talk (LBT) procedure for the UL transmission using the partial subframe, The determining the start time point of the UL transmission based on the signaling information may include determining a start time point of an LBT procedure for the UL transmission using the partial subframe based on the signaling information, The performing the UL transmission according to the start time point of the UL transmission may include starting an LBT procedure for the UL transmission according to the start time point of the LBT procedure.

The determining the symbol configuration of the partial subframe may include determining a position of a start symbol of the partial subframe within a subframe based on the signaling information.

The partial subframe may be a subframe in which a start symbol of a subframe is unoccupied.

The determining the symbol configuration of the partial subframe may include determining a position of the last occupied symbol in the partial subframe within a subframe based on the signaling information.

The partial subframe may be a subframe in which the last symbol of a subframe is unoccupied.

The performing the UL transmission using the partial subframe may include performing rate matching for the UL transmission using the partial subframe based on the symbol configuration.

A base station of a wireless communication system according to an embodiment of the present invention include a communication module; and a processor. The processor may be configured to transmit signaling information related to a start of UpLink (UL) transmission to a user equipment through the communication module, and receive a UL transmission using a partial subframe transmitted based on the signaling information from the user equipment. The partial subframe may be a subframe which occupies less than 14 symbols.

Advantageous Effects

A wireless communication system, in particular, a cellular wireless communication system according to an embodiment of the present invention provides a method and apparatus for efficiently transmitting a signal. In addition, a wireless communication system according to an embodiment of the present invention provides a method and apparatus for efficiently transmitting a signal in a specific frequency band (e.g., unlicensed band). Also, a wireless communication system according to an embodiment of the present invention provides a method and apparatus for efficiently accessing a channel in a specific frequency band (e.g., unlicensed band).

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (01-DMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

This application claims priority to and the benefit of Korean Patent Application Nos. 10-2016-0007301 (2016.01.20), Nos. 10-2016-0013755 (2016.02.23), Nos. 10-2016-0014521 (2016.02.04), and Nos. 10-2016-0046914 (2016.04.18) filed in the Korean Intellectual Property Office and the embodiments and mentioned items described in the respective applications are included in the Detailed Description of the present application.

Figure 1:
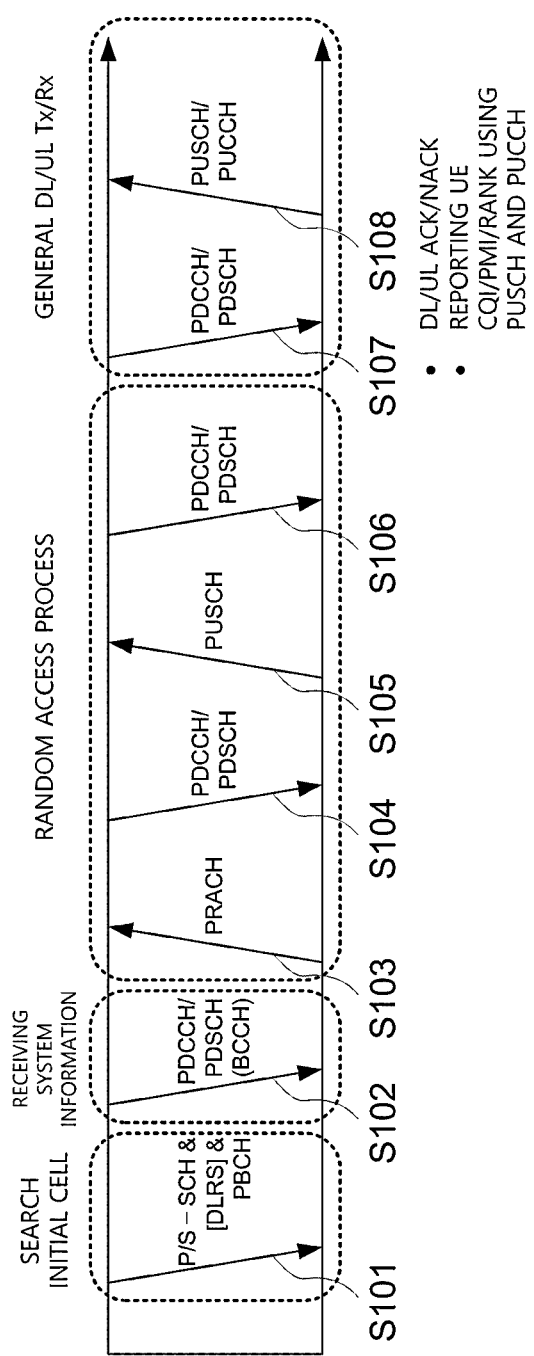
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control channel and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). Firstly, the user equipment may transmit a preamble through a physical random access channel (PRACH) (S103) and receive a response message to the preamble through the PDCCH and the PDSCH corresponding thereto (S104). When the user equipment receive a valid response message to random access, the user equipment may transmit data including an identifier of the user equipment to the base station by using the uplink(UL) grant(S105). To resolve a contention resolution, the user equipment may wait for receiving PDCCH as instruction of the base station. When the user equipment receive PDCCH by using the identifier of the user equipment (S016), random access procedure may end.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the control channel (PDCCH or E-PDCCH). The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
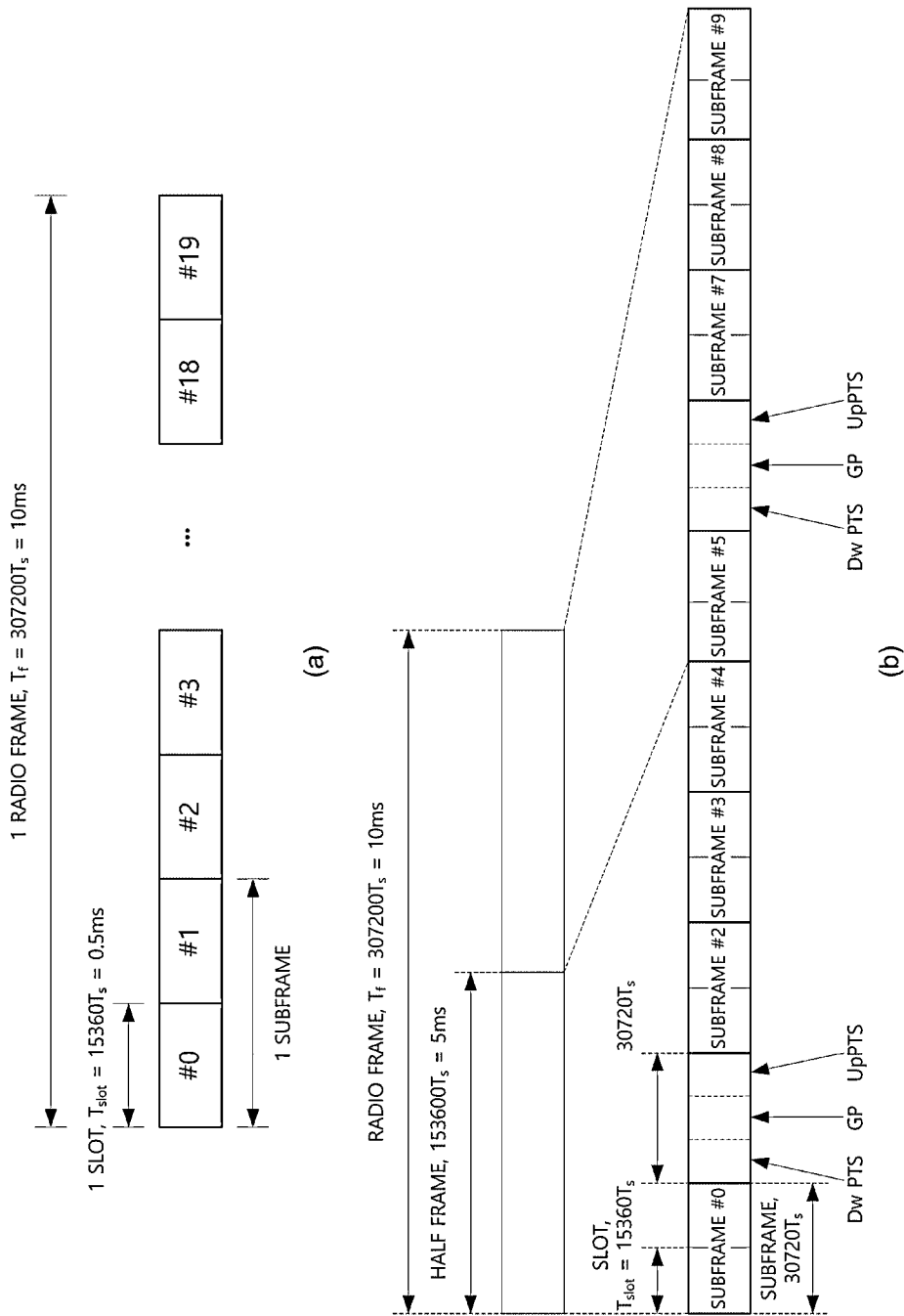
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. 20 slots in one radio frame may be sequentially numbered from 0 to 19. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
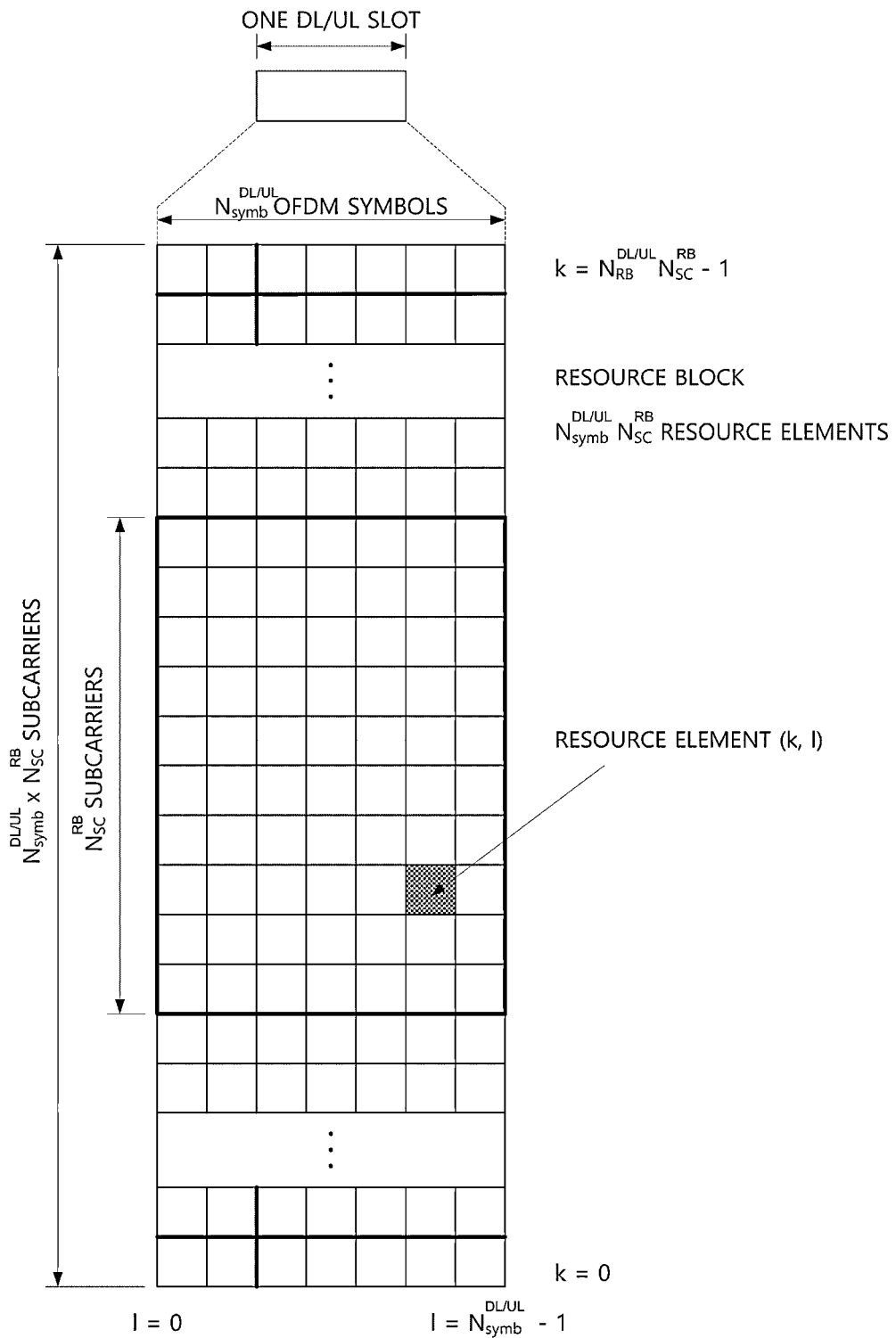
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of 01-DM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriersin the frequency domain A resource constituted by one OFDM symbol and one subcarrier is referred to as a resource element (RE) or a tone. One RB is constituted by $N^{DL/UL}_{symb}*N^{RB}_{sc}$ resource elements.

The resource of the slot may be expressed as a resource grid constituted by $N^{DL/UL}_{RB}*N^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB}*N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
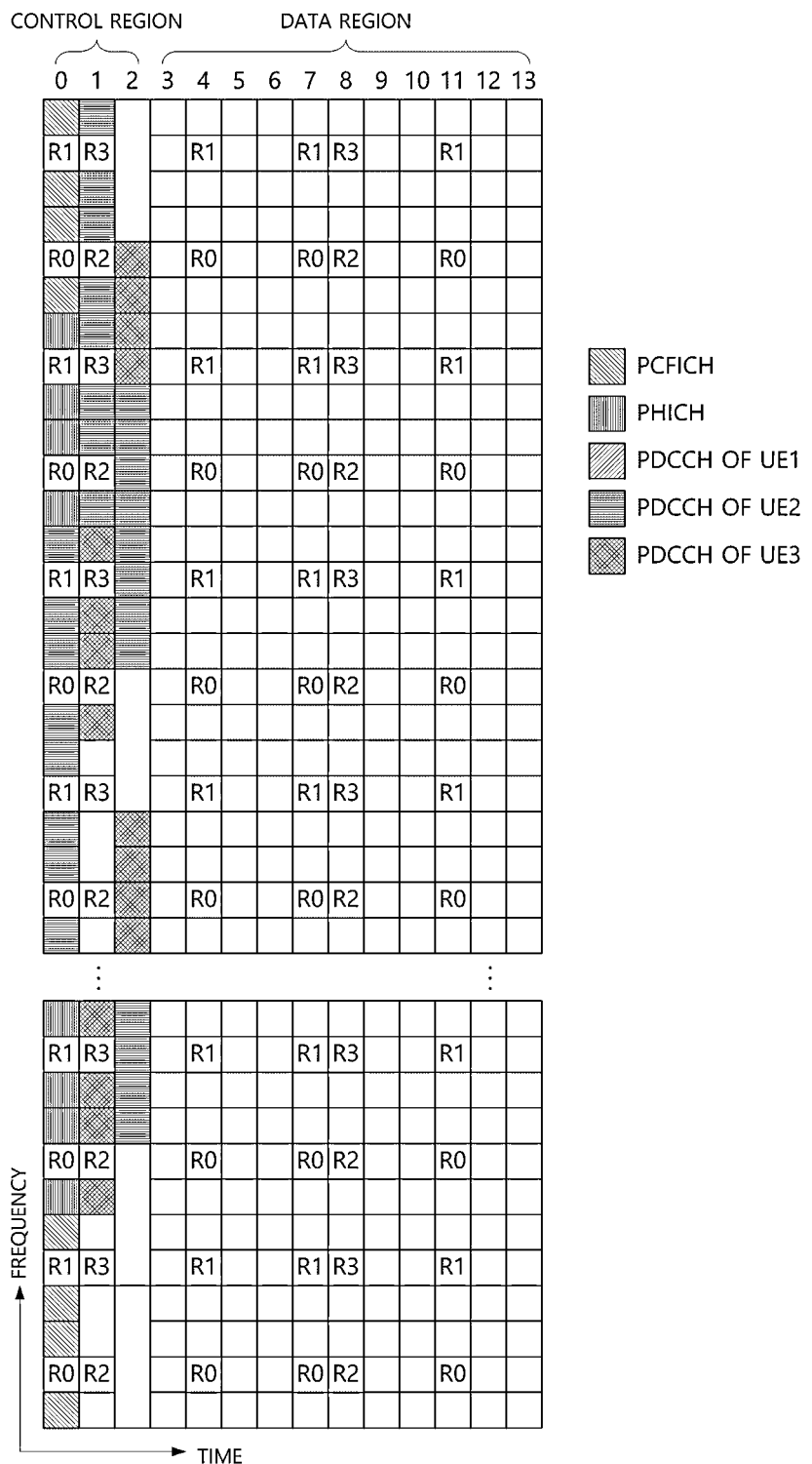
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
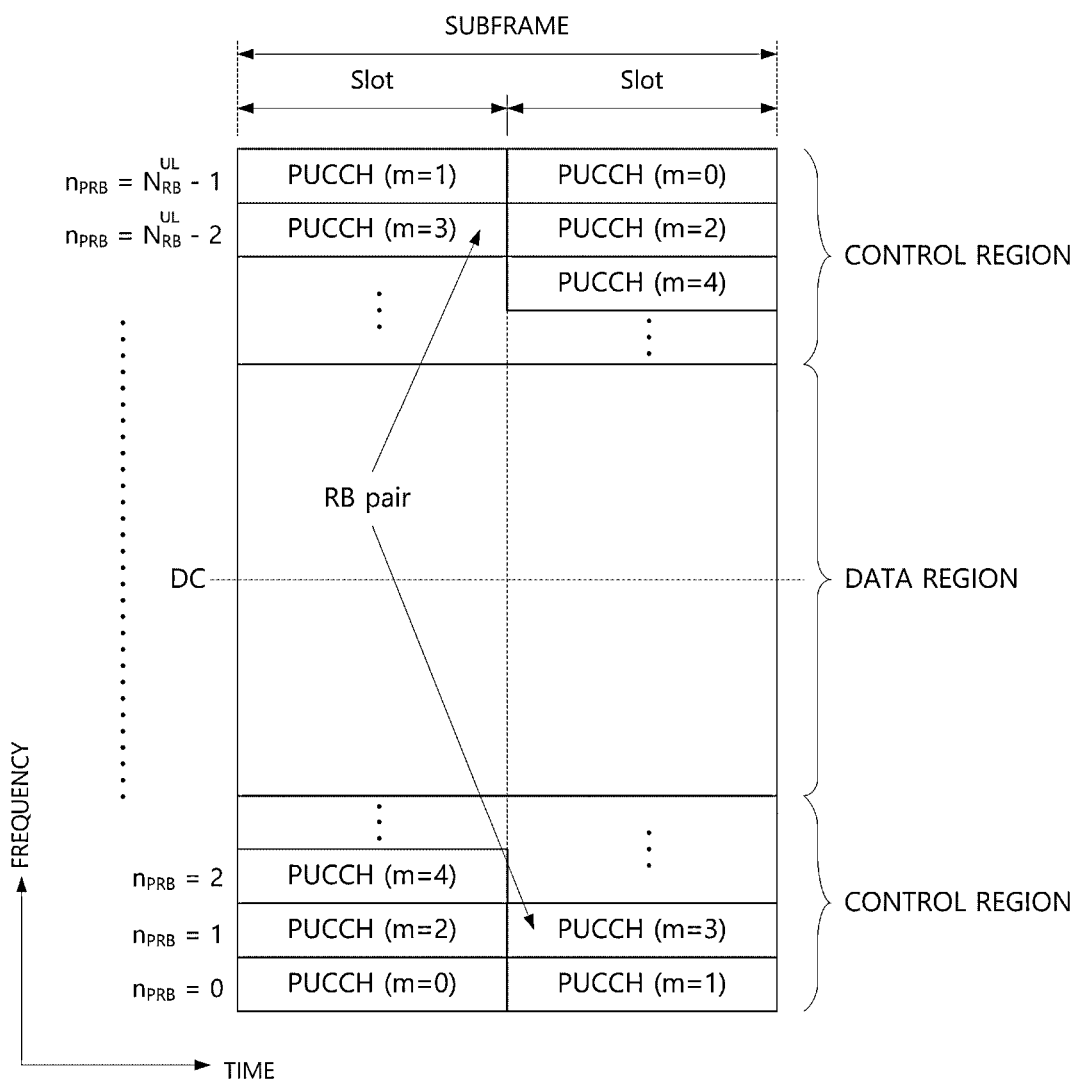
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
|---|---|
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
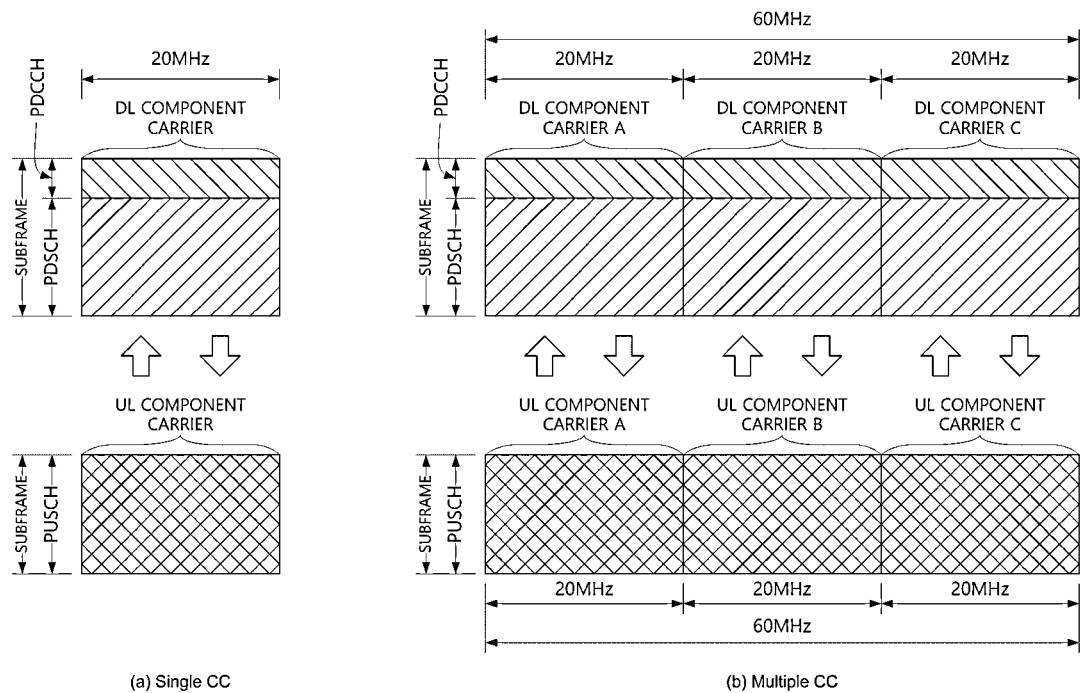
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
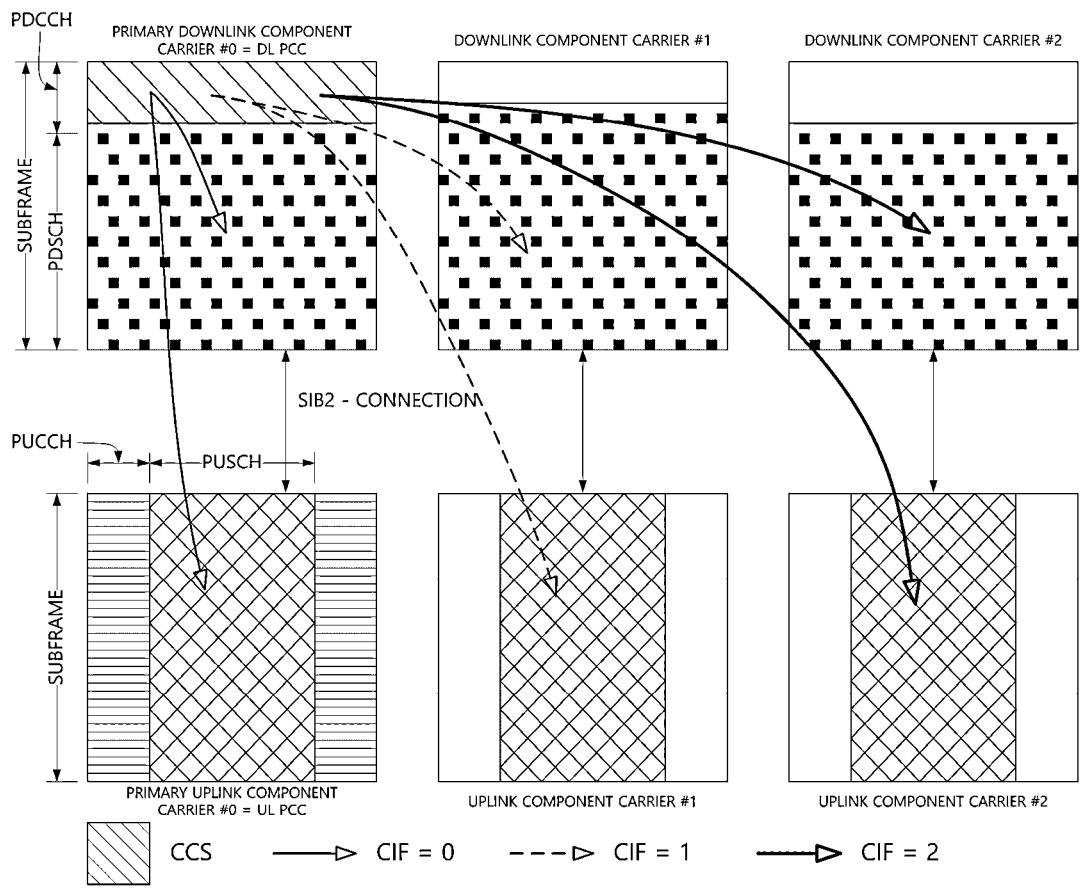
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
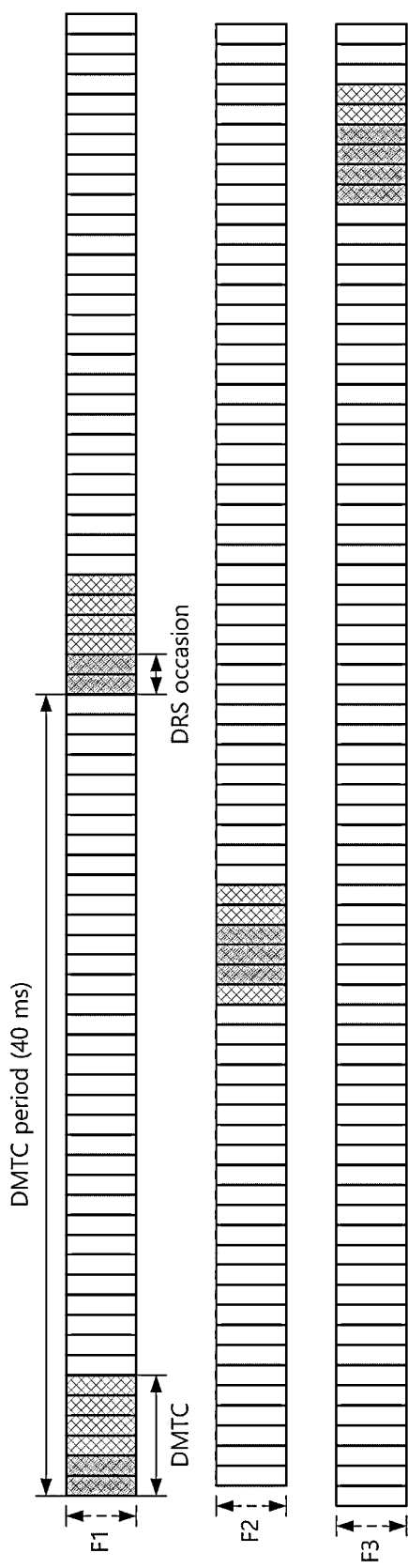
FIG. 8 illustrates Discovery Reference Signal (DRS) transmission.
Figure 9:
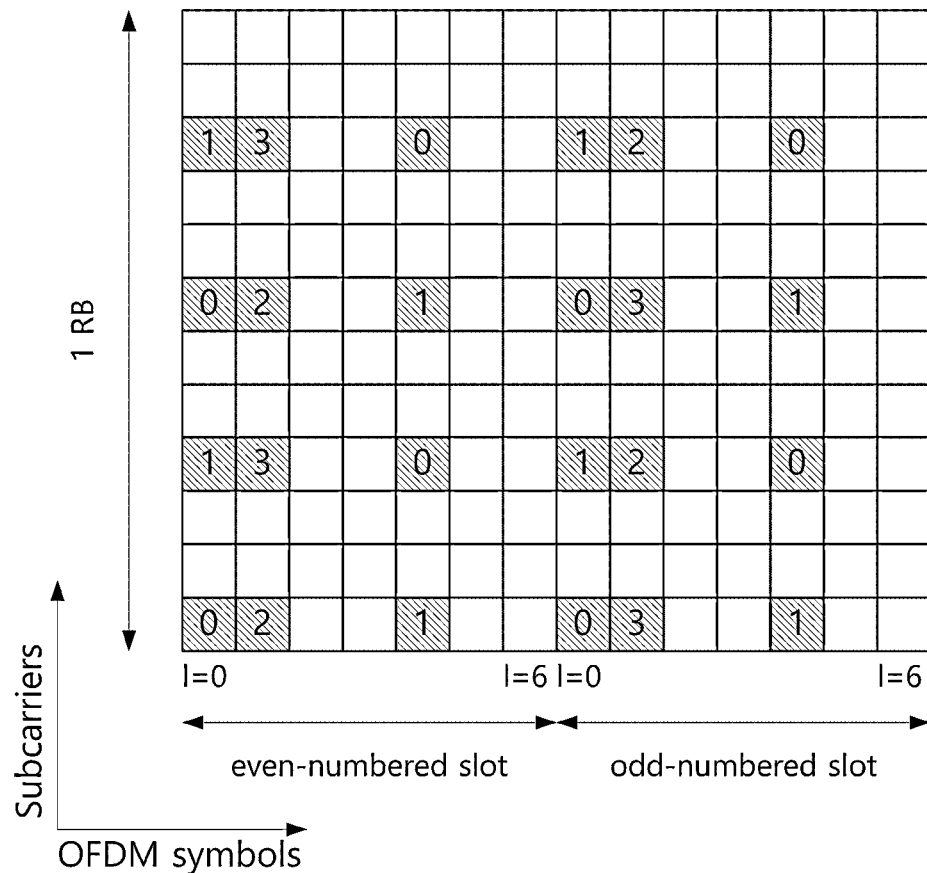
FIGS. 9 to 11 illustrate the structure of a reference signal used as DRS.
Figure 10:
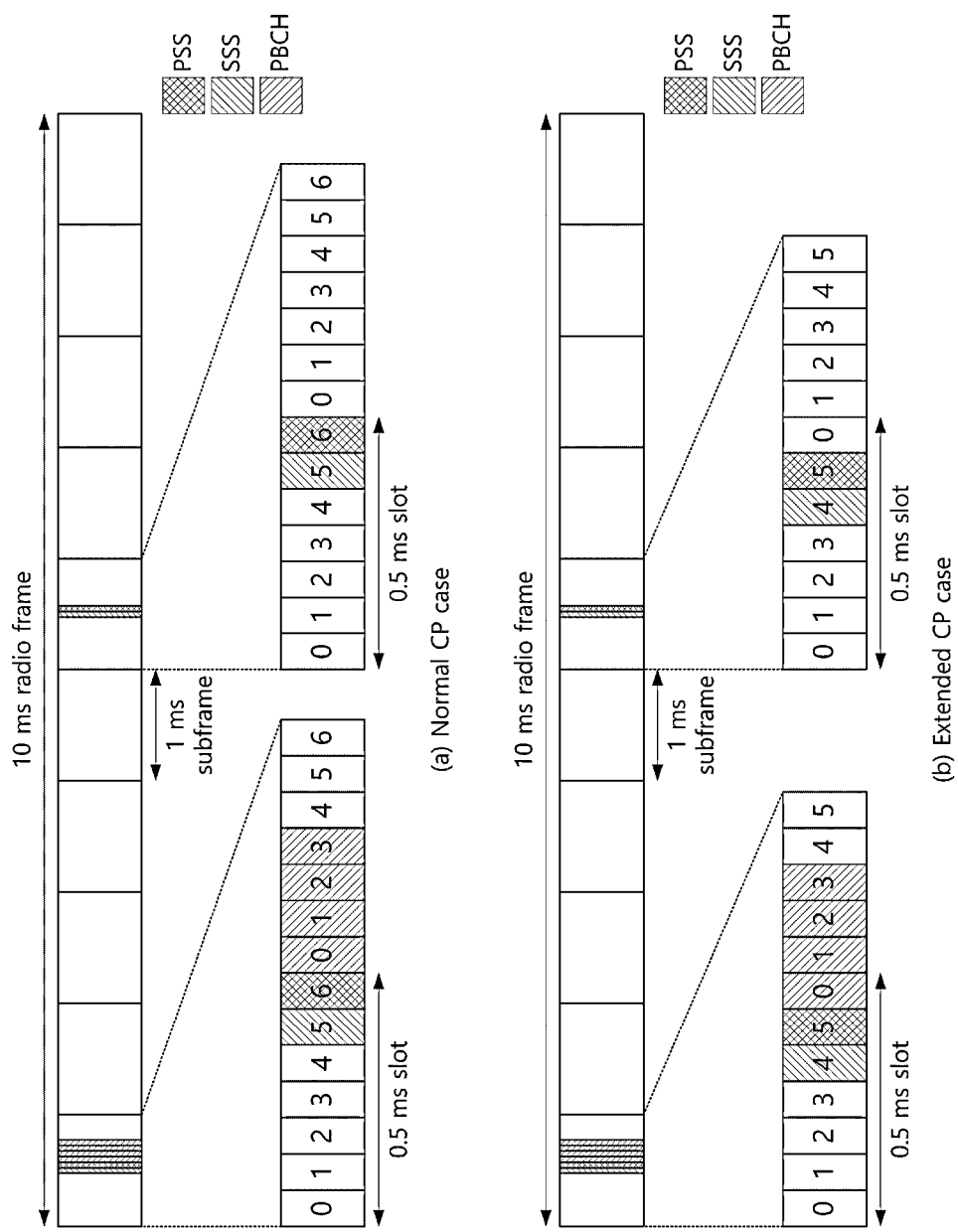
Figure 11:
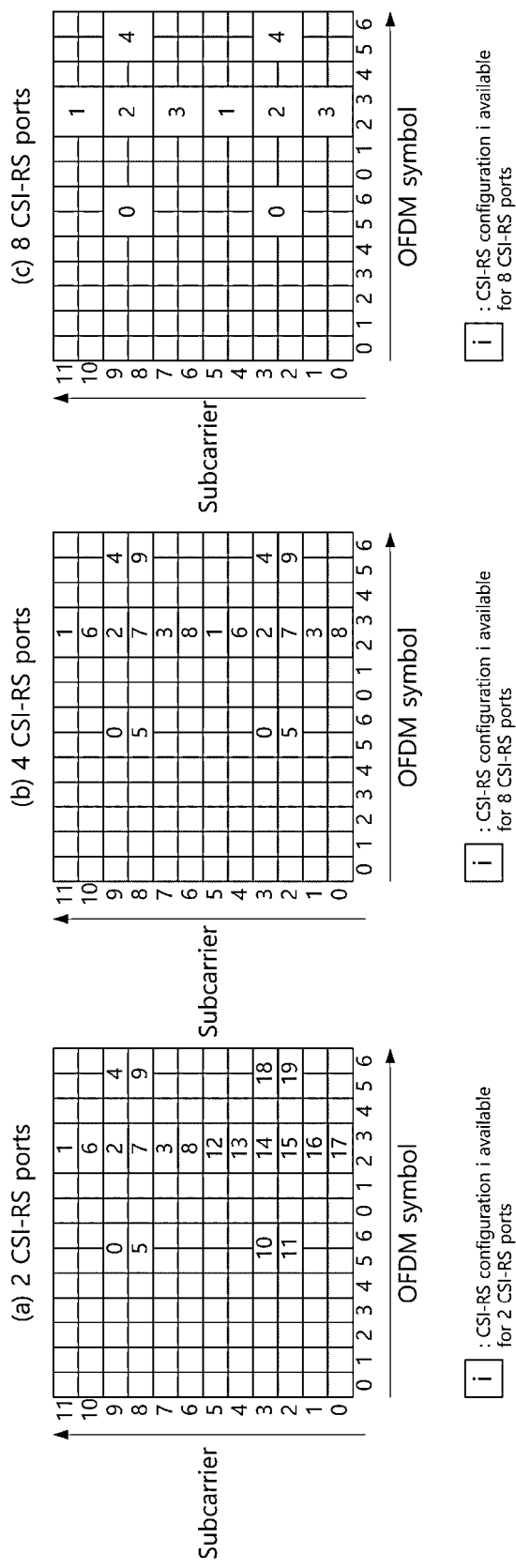

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.

Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
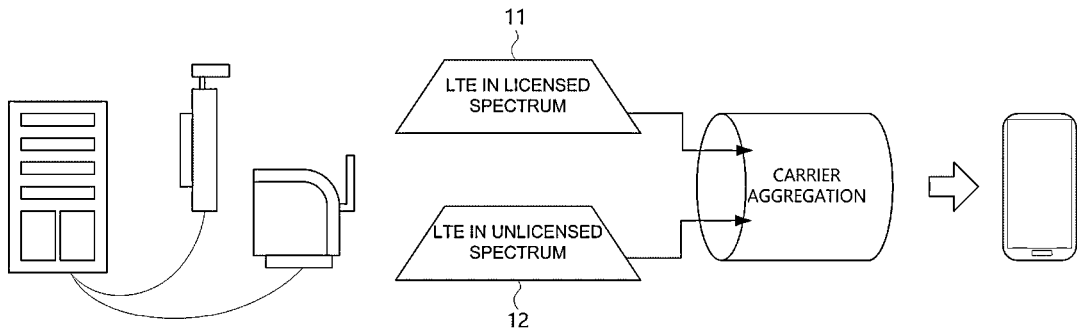
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
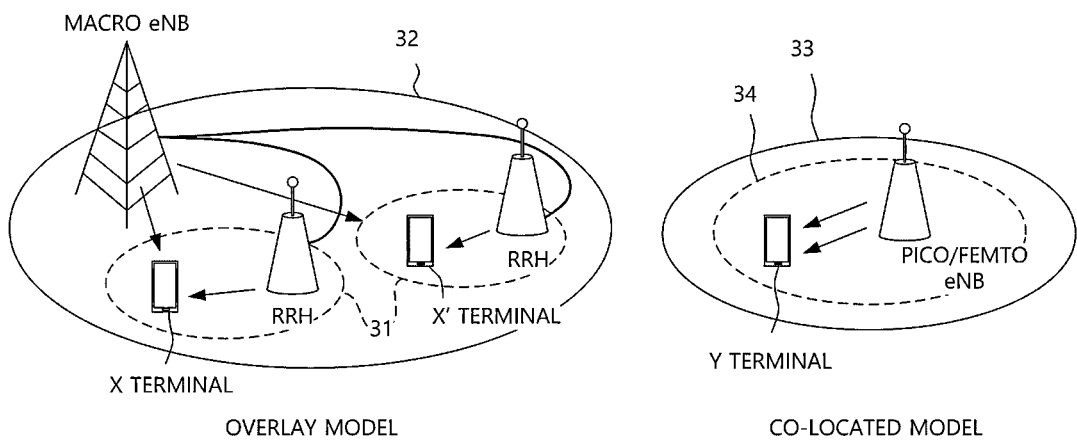
FIG. 13 illustrates a deployment scenario of a user equipment and a base station in an LAA service environment.

FIG. 13 illustrates a deployment scenario of a user equipment and a base station in an LAA service environment.

A frequency band targeted by the LAA service environment has short radio communication range due to the high frequency characteristics. Considering this, the deployment scenario of the user equipment and the base station may be an overlay model or a co-located model in an environment in which coexist the existing LTE-L service and LAA service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Therefore, conventional equipments determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
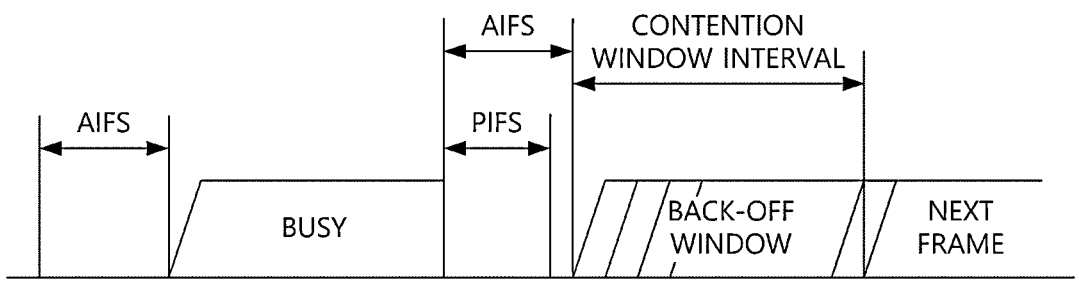
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration means a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.
Category 2: LBT without random backoff
A time interval in which the channel needs to be sensed in an idle state before the Tx entity performs a transmission on the channel is decided. The random backoff is not performed.

Category 3: LBT with random backoff with a CW of fixed size
LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4: LBT with random backoff with a CW of variable size
LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
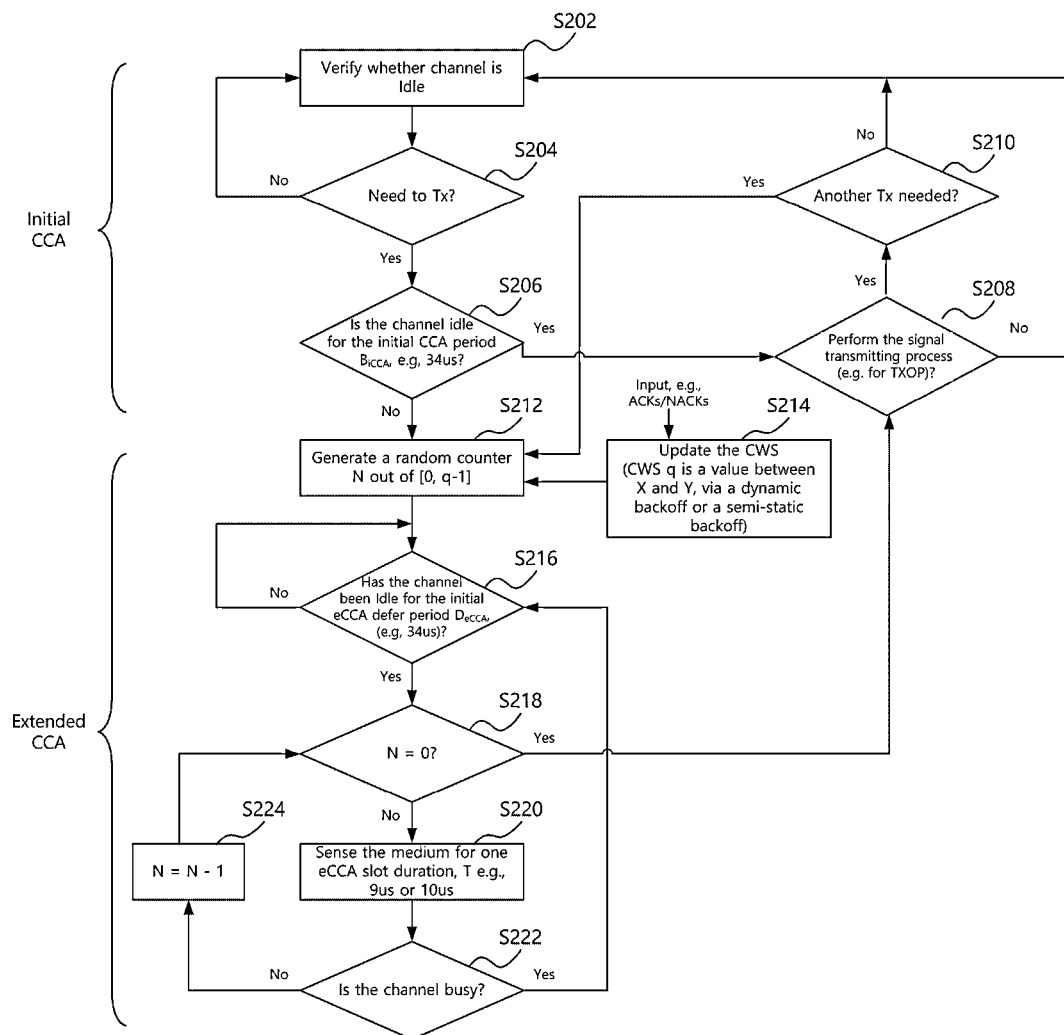
FIGS. 15 and 16 illustrate a Listen-Before-Talk (LBT) procedure for DL transmission.
Figure 16:
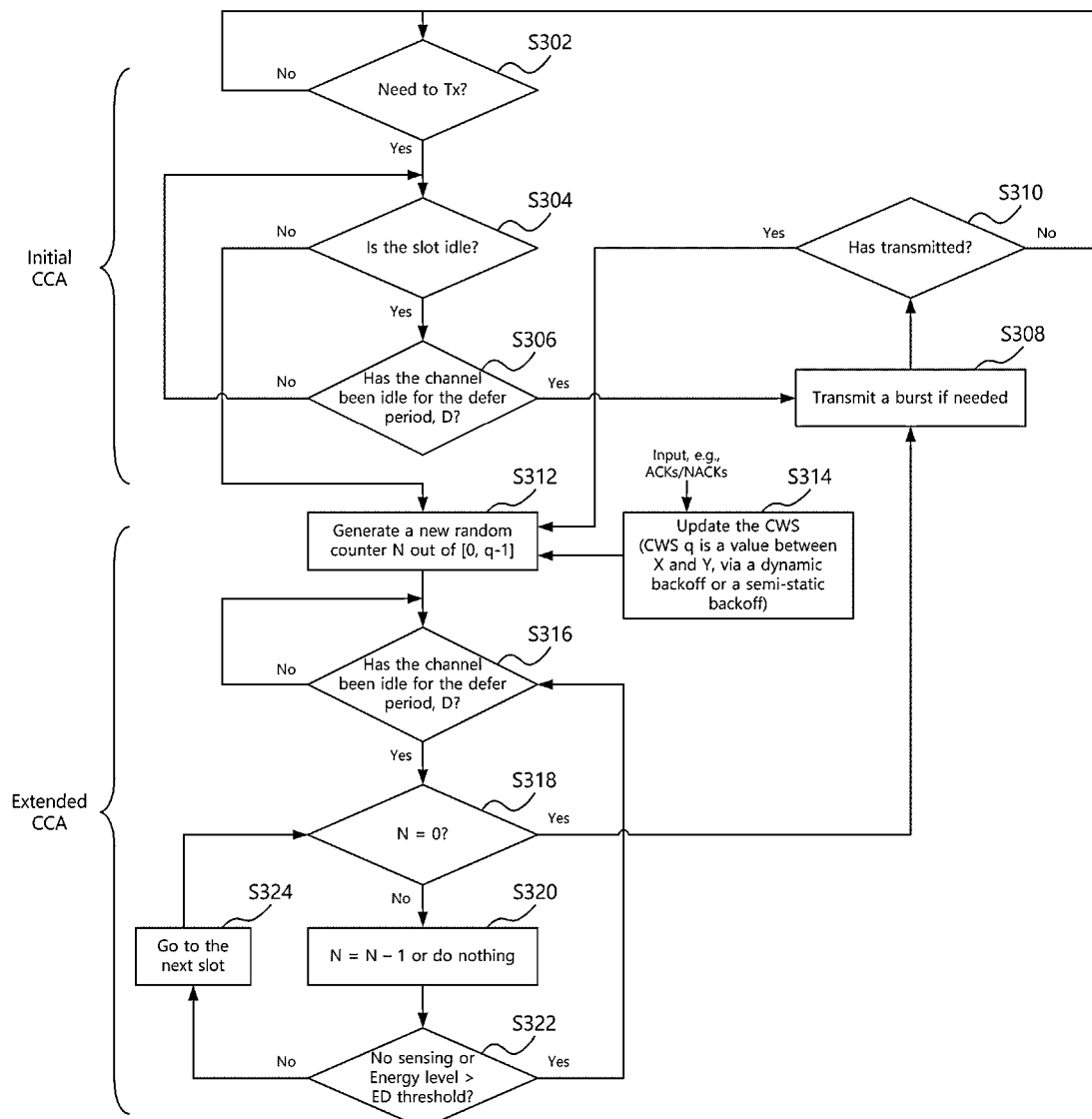

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer duration+backoff counter after setting a random backoff counter.

Referring to FIG. 15, the signal transmission process may be performed as follows.

Initial CCA

S202: The base station verifies that the channel is idle.

S204: The base station verifies whether the signal transmission is required. When the signal transmission is not required, the process returns to S202 and when the signal transmission is required, the process proceeds to S206.

S206: The base station verifies whether the channel is idle for an ICCA defer duration ($B_{CCA}$). The ICCA defer duration is configurable. As an implementation example, the ICCA defer duration may be constituted by an interval of 16 μs and n consecutive CCA slots. Herein, n may be a positive integer and one CCA slot duration may be 9 μs. The number of CCA slots may be configured differently according to a QoS class. The ICCA defer duration may be set to an appropriate value by considering a defer duration (e.g., DIFS or AIFS) of Wi-Fi. For example, the ICCA defer duration may be 34 us. When the channel is idle for the ICCA defer duration, the base station may perform the signal transmitting process (S208). When it is determined that the channel is busy during the ICCA defer duration, the process proceeds to S212 (ECCA).

S208: The base station may perform the signal transmitting process. When the signal transmission is not performed, the process proceeds to S202 (ICCA) and when the signal transmission is performed, the process proceeds to S210. Even in the case where a backoff counter N reaches 0 in S218 and S208 is performed, when the signal transmission is not performed, the process proceeds to S202 (ICCA) and when the signal transmission is performed, the process proceeds to S210.

S210: When additional signal transmission is not required, the process proceeds to S202 (ICCA) and when the additional signal transmission is required, the process proceeds to S212 (ECCA).

Extended CCA

S212: The base station generates the random number N in the CW. N is used as a counter during the backoff process and generated from [0, q−1]. The CW may be constituted by q ECCA slots and an ECCA slot size may be 9 μs or 10 μs. The CW size (CWS) may be defined as q and be variable in S214. Thereafter, the base station proceeds to S216.

S214: The base station may update CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the terminal's feedback/report (e.g., HARQ ACK/NACK) or updated/adjusted based on the base station sensing.

S216: The base station determines that the channel is idle during the ECCA defer duration (DeCCA). The ECCA defer duration is configurable. As an embodiment, the ECCA defer duration may be composed of a 16 μs is section and n consecutive CCA slots. Herein, n is a positive integer and one CCA slot duration may be 9 μs. The number of CCA slots may be set differently according to the QoS class. The ECCA defer duration may be set to an appropriate value by considering the defer duration of Wi-Fi (e.g., DIFS and AIFS). For example, the ECCA defer duration may be 34 us. If the channel is idle during the ECCA defer duration, the base station proceeds to S218. If the channel is determined to be busy during the ECCA defer duration, the base station repeats S216.

S218: The base station checks if N is 0. If N is 0, the base station may perform a signal transmission process (S208). In this case (i.e., N=0), the base station may continue the ECCA procedure by performing CCA checking during at least one slot without performing the transmission immediately. If N is not 0 (i.e., N>0), the process proceeds to S220.

S220: The base station senses the channel for one ECCA slot duration T. The ECCA slot size may be 9 μs or 10 μs, and the actual sensing time may be at least 4 μs.

S222: If it is determined that the channel is idle, the process proceeds to S224. If it is determined that the channel is busy, the process returns to S216. That is, one ECCA defer duration is reapplied after the channel is idle, and N does not count down during the ECCA defer duration.

S224: Decrement N by 1 (ECCA countdown).

FIG. 16 is substantially the same as/similar to the transmission process of FIG. 15 and differs according to the implementation method. Therefore, the details may refer to the contents of FIG. 15.

Initial CCA

S302: The base station checks whether signal transmission is needed. If no signal transmission is required, S302 is repeated, and if signal transmission is required, the process proceeds to S304.

S304: The base station checks if the slot is idle. If the slot is idle, the process proceeds to S306. If the slot is busy, the process proceeds to S312 (ECCA). The slot may correspond to the CCA slot in FIG. 15.

S306: The base station checks that the channel is idle during the defer duration D. D may correspond to the ICCA defer duration in FIG. 15. If the channel is idle during the defer duration, the base station may perform the signal transmission process (S308). If it is determined that the channel is busy during the defer duration, the process proceeds to S304.

S308: The base station may perform the signal transmission process if necessary.

S310: If there is no signal transmission, the process proceeds to S302 (ICCA), and if there is a signal transmission, the process proceeds to S312 (ECCA). Even through the back-off counter N reaches 0 in S318 and S308 is performed, if there is no signal transmission, the process proceeds to S302 (ICCA) and if there is signal transmission, the process proceeds to S312 (ECCA).

Extended CCA

S312: The base station generates a random number N in the CW. N is used as a counter in the back-off process and is generated from [0, q−1]. The CW size CWS is defined by q and may be varied in S314. Thereafter, the base station proceeds to S316.

S314: The base station may update the CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the user equipment's feedback/report (e.g., HARQ ACK/NACK) or updated/adjusted based on the base station sensing.

S316: The base station checks that the channel is idle during the defer duration D. D may correspond to the ECCA defer duration in FIG. 15. D in S306 and S316 may be the same. If the channel is idle during the defer duration, the base station proceeds to S318. If the channel is determined to be busy during the defer duration, the base station repeats S316.

S318: The base station checks if N is 0. If N is 0, the base station may perform a signal transmission process (S308). In this case (N=0), the base station may continue the ECCA procedure by performing CCA checking during at least one slot without performing the transmission immediately. If N is not 0 (i.e., N>0), the process proceeds to S320.

S320: The base station selects one of an operation of decrementing N by 1 (ECCA countdown) and an operation of not decrementing N (self-deferral). The self-deferral operation may be performed according to the implementation/selection of the base station. At the self-deferral time, the base station does not perform sensing for energy detection and does not perform ECCA countdown.

S322: The base station may select one of an operation not to perform sensing for energy detection and an energy detection operation. If sensing for energy detection is not performed, the process proceeds to S324. When the energy detection operation is performed, if the energy level is lower than the energy detection threshold value (i.e., idle), the process proceeds to S324. If the energy level exceeds the energy detection threshold value (i.e., busy), the process returns to S316. That is, one defer duration is reapplied after the channel is idle, and N does not count down during the defer duration.

S324: The process proceeds to S318.

The channel access procedure described with reference to FIGS. 15 and 16 may be used not only for DL transmission but also for UL transmission. Therefore, the base station as well as the user equipment may access the channel according to the channel access procedure described with reference to FIG. 15 and FIG. 16. In the channel access procedure described with reference to FIG. 15 and FIG. 16, the wireless communication device waits for a slot duration by a random number in order to disperse access time points of various wireless communication devices that perform channel access. Therefore, the probability of selecting one of the values in the above-described CWS is uniform. In addition, for the purpose of access distribution, the wireless communication device should wait for another time according to the obtained random number.

As described above, the wireless communication device determines whether the channel is idle during the defer duration. After the defer duration, the wireless communication device waits based on the counter value N determined based on the random number and the slot duration. At this time, the base station may start traffic transmission when the counter value N is 0. In a specific embodiment, the traffic may be a data channel Specifically, the data channel may be either a PDSCH or a PUSCH. In yet another specific embodiment, the traffic may be a control channel. At this time, the control channel may be a PDCCH or an EPDCCH. The wireless communication device sets the counter value N to be randomly selected for access distribution and determines whether the channel to be accessed during a slot duration is idle according to the corresponding counter value. For convenience of explanation, this counter value setting procedure is referred to as a random counter value setting procedure.

Specifically, the wireless communication device senses whether the channel is idle during the defer duration. When the channel is idle during the defer duration, the wireless communication device may set the counter value according to the following procedure.

1) The wireless communication device sets counter (N)=Ninit. Ninit is a random number uniformly distributed within 0 and $CW_p$.

2) When N>0 and the wireless communication device determines to decrease N, set N=N−1.

3) Senses the channel during one additional slot duration, and when the channel is idle during that one slot duration, the wireless communication device goes to step 4), otherwise goes to step 5).

4) When N=0, the wireless communication device stops the counter value setting procedure. When not N=0, the wireless communication device goes to step 2).

5) The wireless communication device senses the channel during one additional defer duration.

6) When the channel is idle during a plurality of slot durations that include one additional defer duration, the wireless communication device goes to step 2), and when the channel is not idle during that one additional defer duration, the wireless communication device goes to step 5).

When the wireless communication terminal fails to transmit traffic on the channel to be accessed in step 4) in the above-described procedure, the wireless communication terminal may transmit traffic when the channel is idle during one additional defer duration. In addition, when the wireless communication device stops the counter value setting procedure, the wireless communication device starts the traffic transmission.

When the traffic includes a data channel, the defer duration may be set according to the channel access priority class of the traffic that the data channel is included in. At this time, the channel access priority class may be a channel access priority class. Also, the defer duration may be composed of 16 us (Tf) and $m_p$ number of slot durations. At this time, each slot duration Tsl may be 9 us. Tf includes one idle slot duration Tsl. Also, the $m_p$ value may be set according to the channel access priority class as shown in Table 2 below.

TABLE 2

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may also set a range of CW values according to the channel access priority class. Specifically, the wireless communication device may set the range of the CW values to satisfy $CW_{min,p} \leq CW_p \leq CW_{max,p}$. At this time, the value of $CW_{min,p}$ and the value of $CW_{max,p}$ may be determined according to the channel access priority class as shown in Table 2 described above. Also, the wireless communication device may set the value of $CW_{min,p}$ and the value of $CW_{max,p}$ in step 1) of the counter value setting procedure. During channel access, the base station may adjust the CW value as described above.

Also, the maximum transmission duration $T_{-mcot,p}$ (maximum channel occupancy time (MCOT)) that may be used in one transmission through a channel included in the unlicensed band may be determined according to the channel access priority of the transmitted data. Specifically, it may be determined as shown in Table 2 above. Accordingly, the wireless communication device should not maintain a transmission continuously more than a time T_mcot,p. In the unlicensed band, since it is a frequency band accessed by several wireless communication devices through contention procedures, it is not preferable that any one of the wireless communication devices continuously use the frequency band for a predetermined time or more. In Table 2, when the value of the channel access priority class is p=3 or p=4, in a long term, the unlicensed band is used according to the rule, and there is no wireless communication device using other technology, the wireless communication device may set to $T_{-mcot,p}$=10 ms. Otherwise, the wireless communication device may set to $T_{-mcot,p}$=8 ms.

Also, the wireless communication device determines whether the channel is idle based on an energy detection (ED) threshold value. Specifically, the wireless communication device may determine that the channel is idle when the energy detected by the channel is smaller than the threshold value. At this time, the ED threshold value may vary depending on whether or not a wireless communication device using other technology coexists. In addition, the ED threshold may vary depending on the country and region. Specifically, the ED threshold value may be determined as shown in Table 3 below.

TABLE 3

| Case | ED adaptation rule | Note |
| --- | --- | --- |
| Case 1: Coexistance with other technologies | $X_{Thresh\_max} = \max\left\{\begin{array}{l}-72 \text{ dBm (20 MHz)}\\ \min\left\{\begin{array}{l}T_{max},\\ T_{max} - T_A + (P_H - P_{TX})\end{array}\right\}\end{array}\right\}$<br><br>$P_H = 23$ dB<br>$P_{TX}$ is the set Max eNB output power in dBm for the carrier | $T_A = 10$ dB for fx(s) including PDSCH;<br>$T_A = 5$ dB for fx(s) including DRS transmission(s) and not including PDSCH |
| Case 2: Absence of Wi-Fi (e.g: by level of regulation) | $X_{Thresh\_max} = \min\left\{\begin{array}{l}T_{max} + 10 \text{ dB},\\ X_r\end{array}\right\}$<br>Xr[dBm] is MAX ED threshold defined by regulation Otherwise | |

In this case, the value of $T_{\_max}$ in Table 3 may be determined as shown in the following equation.

$$T_{max}(\text{dBm}) = 10 \cdot \log 10(3.16228 \cdot 10^{-8}(\text{mW/MHz}) \cdot \text{BWMHz(MHz)})$$

The wireless communication device may perform transmission through a plurality of carriers. Thus, the embodiments described above may be used equally when a wireless communication device accesses a channel on any one carrier as well as through a plurality of carriers. At this time, channel access methods for a plurality of carriers may be distinguished as follows. When the wireless communication device performs the channel access procedure independently from each of a plurality of carriers, the corresponding channel access may be classified as Type A. In this case, when the wireless communication device obtains a random number independently for each carrier, the corresponding channel access may be classified as Type A1. Also, when one random number is obtained and used based on the largest CWS among the CWS corresponding to each carrier, the corresponding channel access may be classified as Type A2. In addition, when a wireless communication device accesses a channel on a plurality of carriers based on the channel access procedure for any one carrier, the corresponding channel access may be classified as Type B.

When a wireless communication device accesses a channel on a plurality of carriers according to the classification described above, the wireless communication device may not be able to start transmissions simultaneously on a plurality of carriers. This is because channel states corresponding to each of a plurality of carriers may be different from each other and channel access parameters corresponding to each of a plurality of carriers, for example, defer duration may be different. At this time, due to the RF leakage occurring from the channel or the carrier which starts transmission relatively first, the wireless communication device may not be able to transmit signals on the channel or carrier that starts transmission at a relatively later time.

Therefore, the wireless communication device may perform an operation for starting transmission simultaneously on a plurality of carriers in the counter value setting procedure described above. Specifically, in the counter value setting procedure described above, the wireless communication device may selectively subtract 1 from the counter value. Through this, the wireless communication device may delay the start of transmission on any one channel. As described above, this may be referred to as self-deferral. Another embodiment, in which when a wireless communication device accesses a plurality of carriers, transmission may be started simultaneously on a plurality of carriers, will be described with reference to FIGS. 17 to 35.

FIGS. 17 to 20 show that a wireless communication device according to an embodiment of the present invention schedules transmission of traffic having a defer duration of the same duration to a plurality of carriers.

In one embodiment of the present invention, a wireless communication device may schedule transmissions of traffic having defer durations of the same duration to a plurality of carriers. Specifically, a wireless communication device may schedule transmissions of traffic having defer durations of the same duration to a plurality of carriers. In addition, even if a wireless communication device has different channel access priorities, the wireless communication device may schedule transmission of traffic having the same defer duration to a plurality of carriers. The channel access priority may be the channel access priority class described above. At this time, the channel access priority class may be a value of any one of 1 to 4. Also, the traffic may include at least one of a data channel and a control channel. At this time, the data channel may be a PDSCH or a PUSCH. Also, the control channel may be any of a PDCCH, an EPDCCH, and a PUCCH. As the duration of the defer duration becomes the same, the wireless communication device may increase the probability of starting transmission simultaneously on a plurality of carriers.

Figure 17:
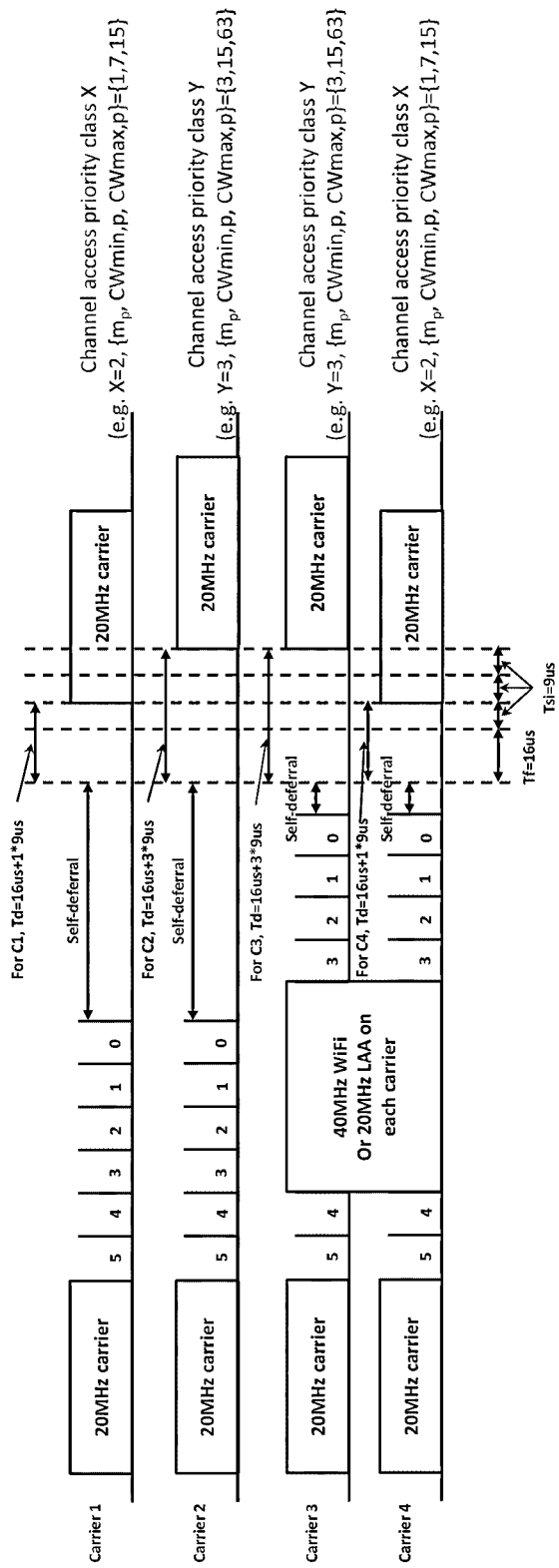
FIGS. 17 to 20 show that a wireless communication device according to an embodiment of the present invention schedules transmission of traffic having a defer duration of the same duration to a plurality of carriers.
Figure 18:
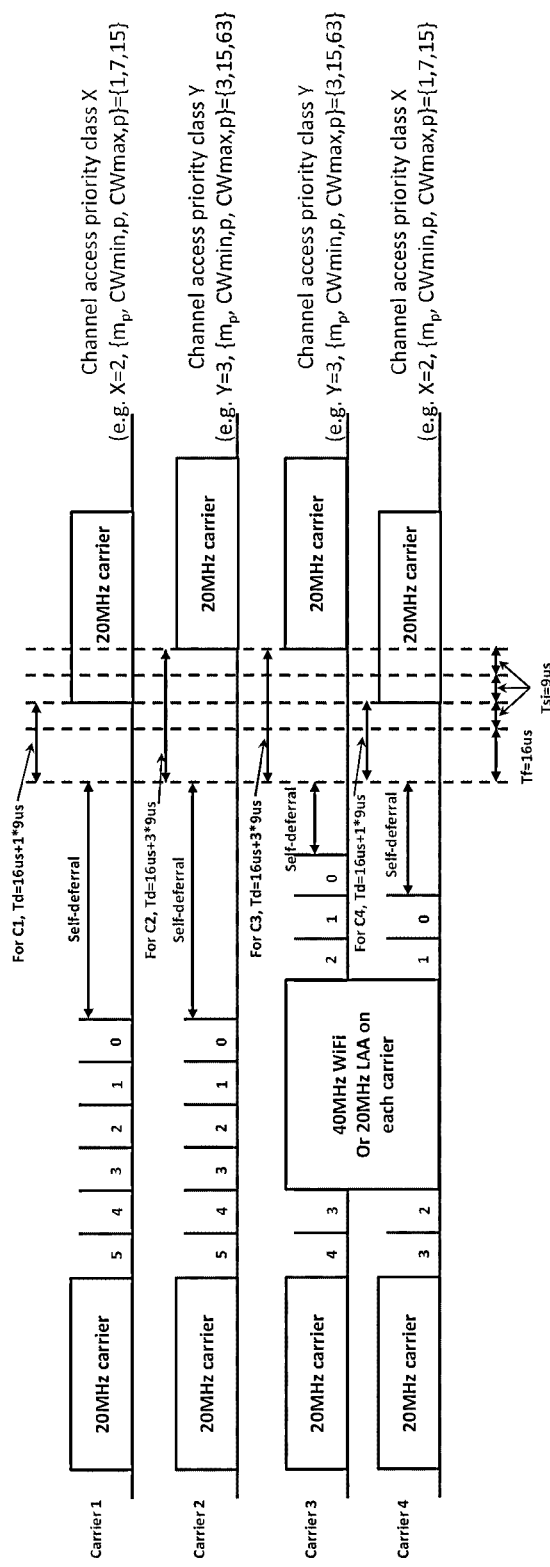

As in the embodiment of FIG. 17, the wireless communication device may set the same counter value for each carrier in the backoff procedure. Also, as in the embodiment of FIG. 18, the wireless communication device may independently set the counter value for each carrier in the backoff procedure. In the embodiment of FIGS. 17 and 18, the wireless communication device schedules traffic with the same channel access priority class to the first carrier Carrier1 and the fourth carrier Carrier4. At this time, the channel access priority class is 2. Accordingly, when the wireless communication device accesses the first carrier Carrier1 and the fourth carrier Carrier4, the wireless communication device uses a defer section of 25 us. In the embodiment of FIGS. 17 and 18, the wireless communication device schedules traffic with the same channel access priority class to the second carrier Carrier2 and the fourth carrier Carrier3. At this time, the channel access priority class is 3. Accordingly, when the wireless communication device accesses the second carrier Carrier2 and the third carrier Carrier3, the wireless communication device uses a defer duration of 43 us.

Figure 19:
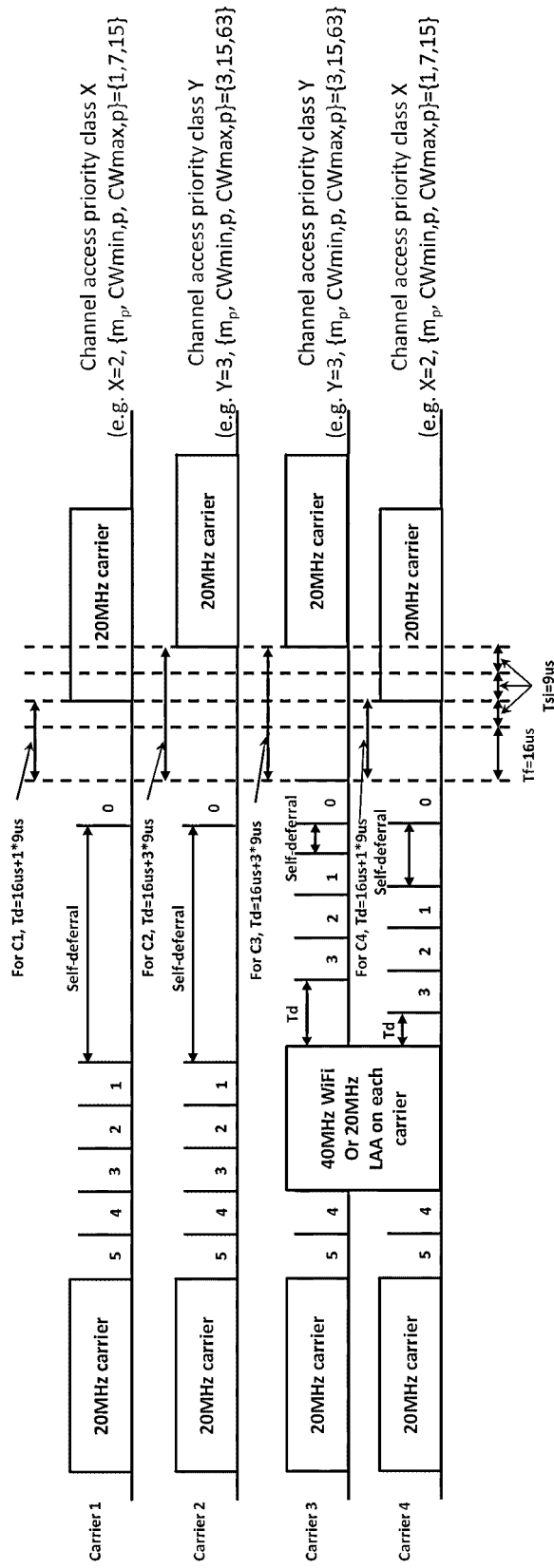
Figure 20:
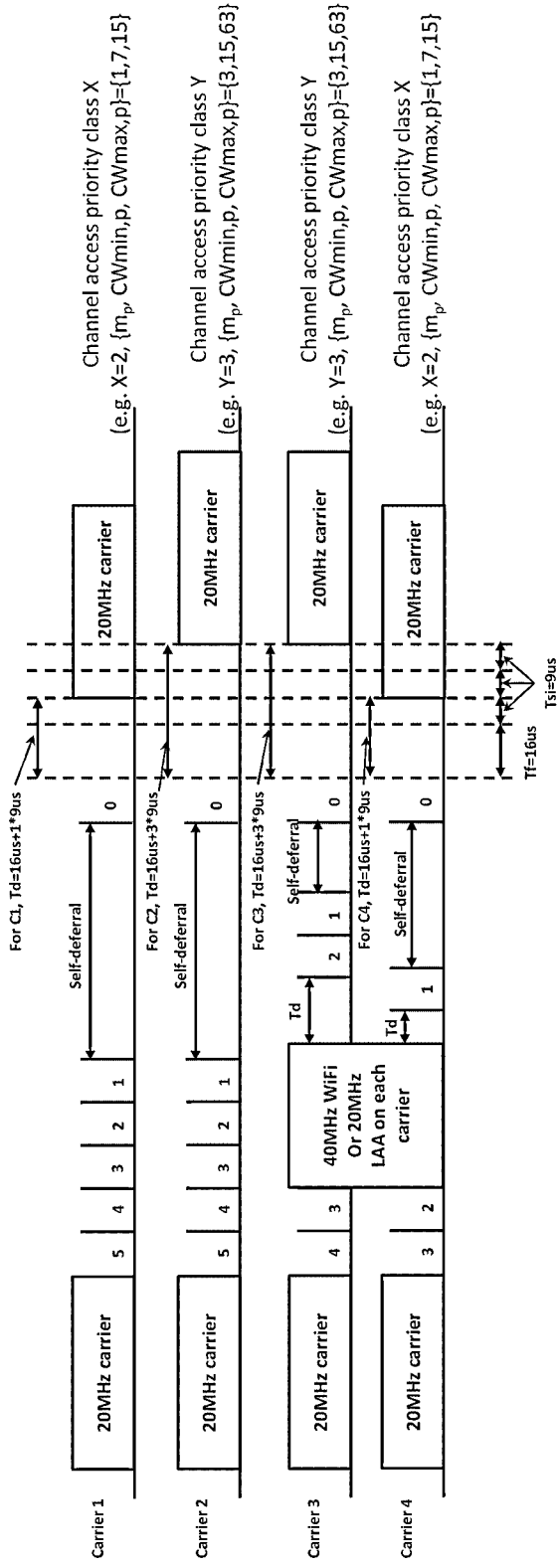

The wireless communication device may perform self deferral even after the counter value reaches zero. The wireless communication device may perform self deferral even after the counter value reaches zero. In the embodiment of FIGS. 17 and 18, the wireless communication device performs self deferral after the counter value reaches zero. In the embodiment of FIGS. 19 and 20, the wireless communication device performs self deferral before the counter value reaches zero. The other operation of the wireless communication device in the embodiment of FIG. 19 is the same as the operation of the wireless communication device in the embodiment of FIG. 17. In addition, the other operation of the wireless communication device in the embodiment of FIG. 20 may be the same as the operation of the wireless communication device in the embodiment of FIG. 18.

In another specific embodiment, when a wireless communication device transmits a plurality of carriers, the wireless communication device may set a defer duration of the same length for each of a plurality of carriers. Specifically, when a wireless communication device transmits a plurality of carriers, the wireless communication device may set $m_p$, which represents the number of slots constituting the defer duration, to the same value for each of a plurality of carriers. For convenience of description, the $m_p$ value used equally when a wireless communication device transmits a plurality of carriers is referred to as a common $m_p$. At this time, the defer duration may be $Tf+m_p*Tsl$ as described above. Also, Tf may be 16 us. At this time, the wireless communication device may set a defer duration having the same length even when transmitting traffic having different channel access priority through a plurality of carriers. Also, the wireless communication device may set a defer duration of the same length when transmitting traffic having a channel access priority corresponding to different defer durations through a plurality of carriers. An embodiment for setting a defer duration of the same length will be described with reference to FIGS. 21 to 28.

FIGS. 21 to 24 show that the wireless communication device sets the largest value among the plurality of $m_p$ corresponding to channel access priorities of traffic transmitted through a plurality of carriers to a common $m_p$.

The wireless communication device may set the largest value among the plurality of $m_p$ corresponding to the channel access priority of traffic transmitted through a plurality of carriers to a common $m_p$. Specifically, the wireless communication device may set a value of a common $m_p$ $m_p$_common as shown in the following equation.

$$m_p\_common=\max\{m_p\_c\_0,\ldots,m_p\_c\_n-1\}$$

At this time, $m_p$_c_i indicates an $m_p$ value corresponding to the channel access priority of the traffic to be transmitted through the (i+1)-th carrier. Also, a wireless communication device transmits traffic through n carriers. At this time, the wireless communication device may simultaneously transmit traffic having a relatively low channel access priority and traffic having a relatively high channel access priority.

Figure 21:
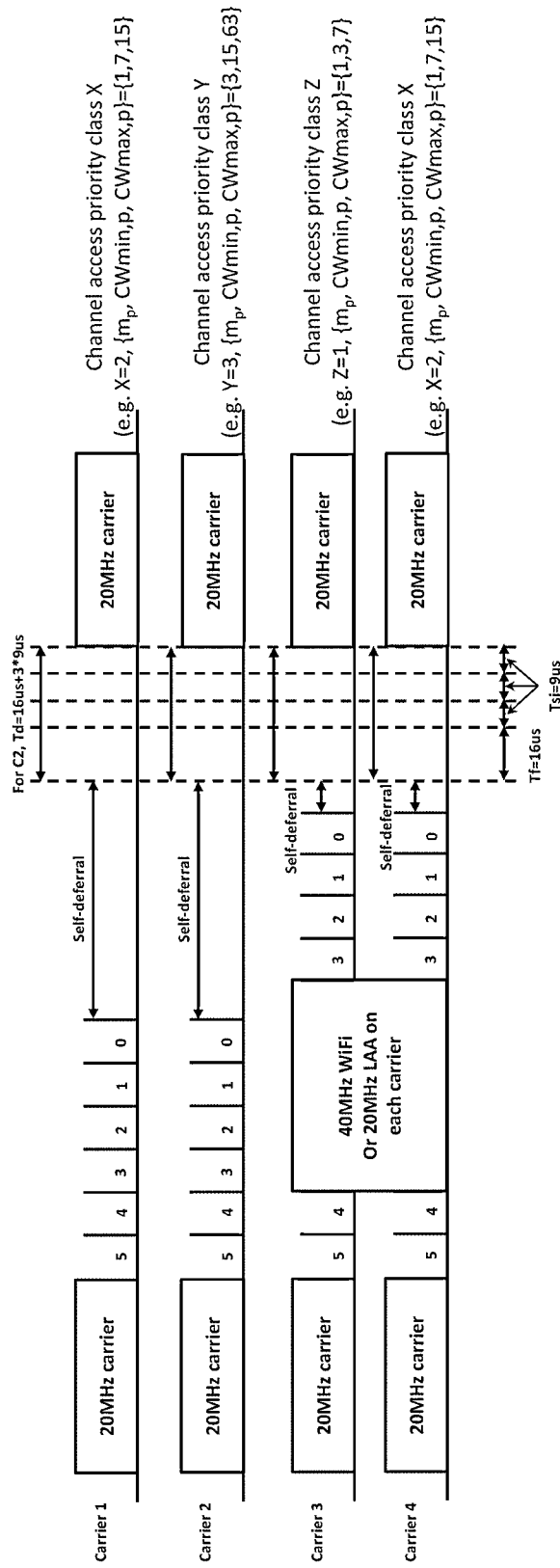
FIGS. 21 to 24 show that the wireless communication device sets the largest value among the plurality of $m_p$ corresponding to channel access priorities of traffic transmitted through a plurality of carriers to a common $m_p$.
Figure 22:
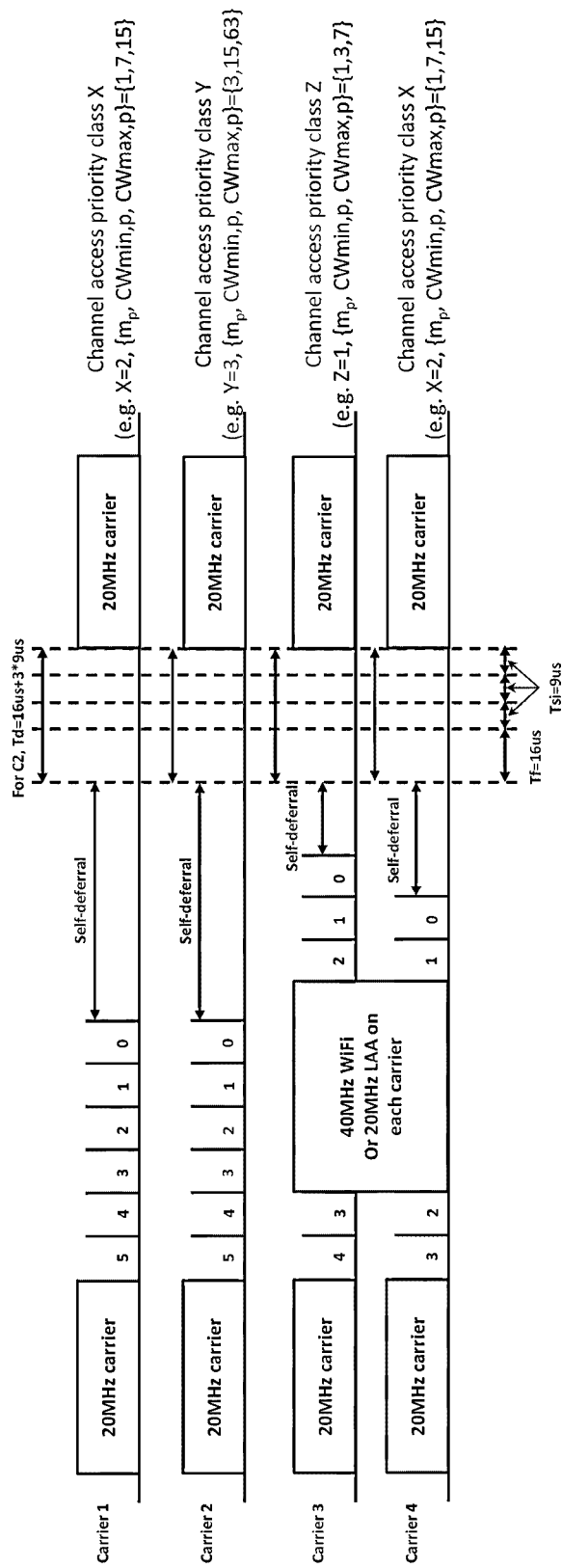

As in the embodiment of FIG. 21, the wireless communication device may set the same counter value for each carrier in the backoff procedure. Also, as in the embodiment of FIG. 22, the wireless communication device independently sets the counter value for each carrier in the backoff procedure. In the embodiment of FIGS. 21 and 22, the $m_p$ value of the first carrier Carrier1, the third carrier Carrier3, and the fourth carrier Carrier4 is 1 and the $m_p$ value of the second carrier Carrier2 is 3. The maximum value of 1 and 3 is 3. Therefore, the wireless communication device sets a common $m_p$ to 3 for the first carrier Carrier1 to the fourth carrier Carrier4. Therefore, the wireless communication device accesses the first carrier Carrier1 to the fourth carrier Carrier4 according to 43 us, which is a defer duration corresponding to an $m_p$ value of 3. Thus, the wireless communication device may increase the probability of starting transmission simultaneously from the first carrier Carrier1 to the fourth carrier Carrier4.

Figure 23:
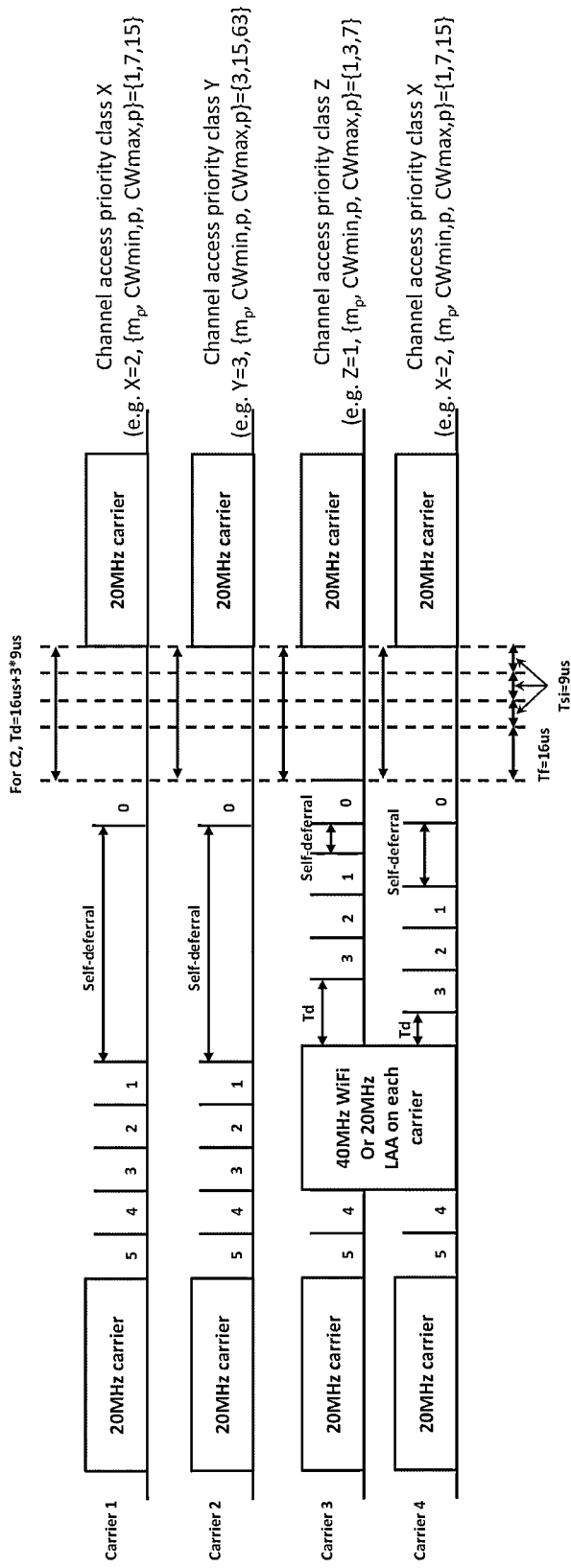
Figure 24:
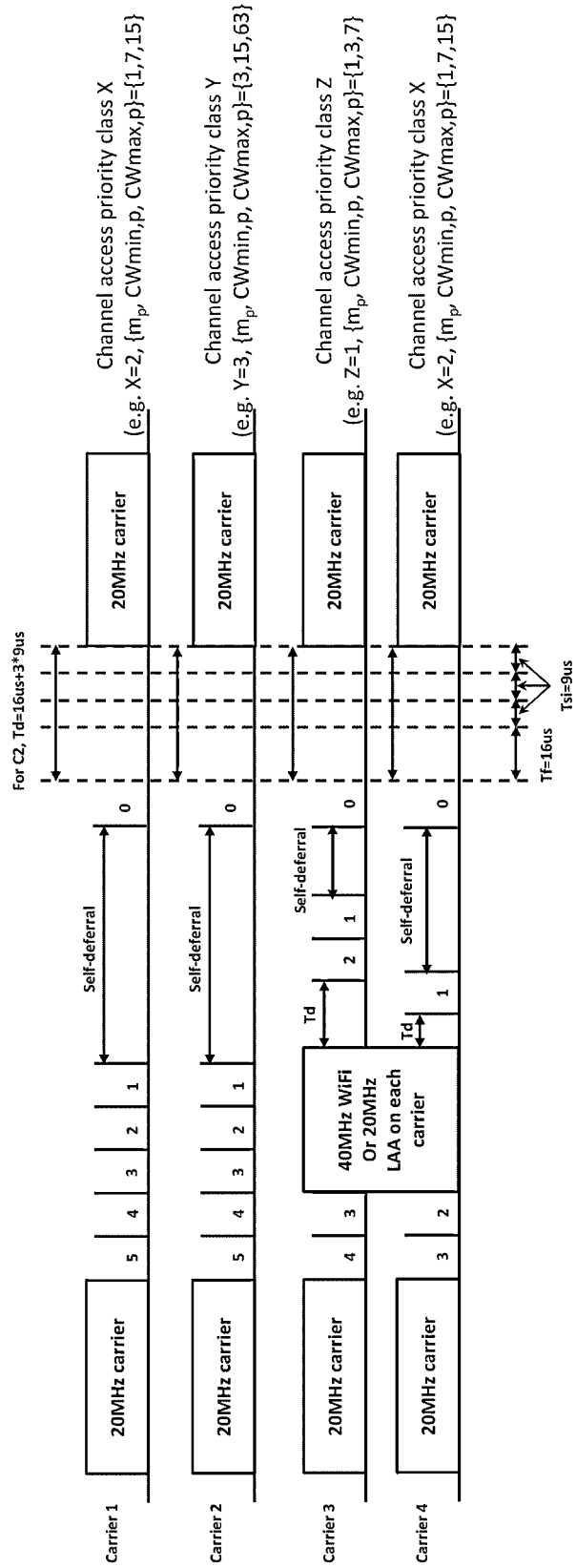

As described above, the wireless communication device may perform self deferral even after the counter value reaches zero. The wireless communication device may perform self deferral even after the counter value reaches zero. In the embodiment of FIGS. 21 and 22, the wireless communication device performs self deferral after the counter value reaches zero. In the embodiment of FIGS. 23 and 24, the wireless communication device performs self deferral before the counter value reaches zero. The other operation of the wireless communication device in the embodiment of FIG. 23 is the same as the operation of the wireless communication device in the embodiment of FIG. 21. In addition, the other operation of the wireless communication device in the embodiment of FIG. 24 is the same as the operation of the wireless communication device in the embodiment of FIG. 22.

In another specific embodiment, the wireless communication device may set the smallest value among the plurality of $m_p$ corresponding to the channel access priority of traffic transmitted through a plurality of carriers to a common $m_p$. Specifically, the wireless communication device may set a value of a common $m_p$ $m_p$_common as shown in the following equation.

$$m_p\_common=\min\{m_p\_c\_0,\ldots,m_p\_c\_n-1\}$$

At this time, $m_p$_c_i indicates an $m_p$ value corresponding to the channel access priority of the traffic to be transmitted through the (i+1)-th carrier. Also, a wireless communication device transmits traffic through n carriers. At this time, the wireless communication device may transmit traffic having a relatively low channel access priority according to a relatively high channel access priority.

FIGS. 25 to 28 show that the wireless communication device sets the smallest value among the plurality of $m_p$ corresponding to channel access priorities of traffic transmitted through a plurality of carriers to a common $m_p$.

Figure 25:
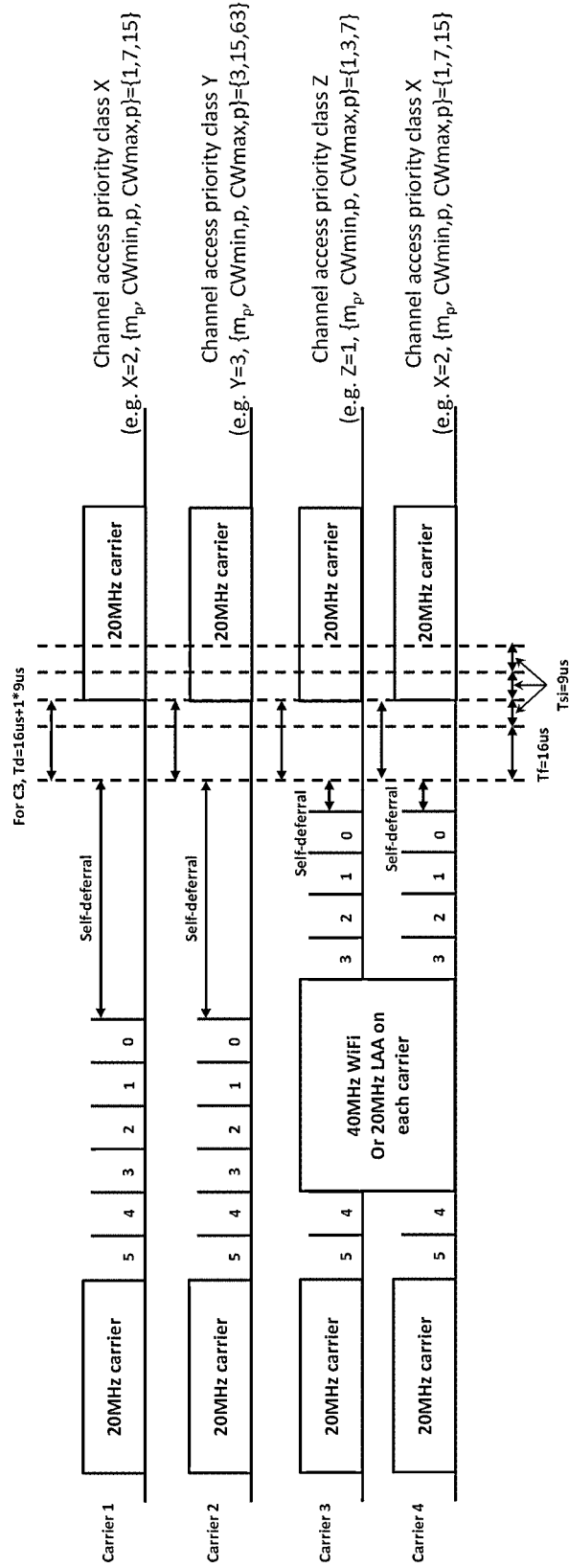
FIGS. 25 to 28 show that the wireless communication device sets the smallest value among the plurality of $m_p$ corresponding to channel access priorities of traffic transmitted through a plurality of carriers to a common $m_p$.
Figure 26:
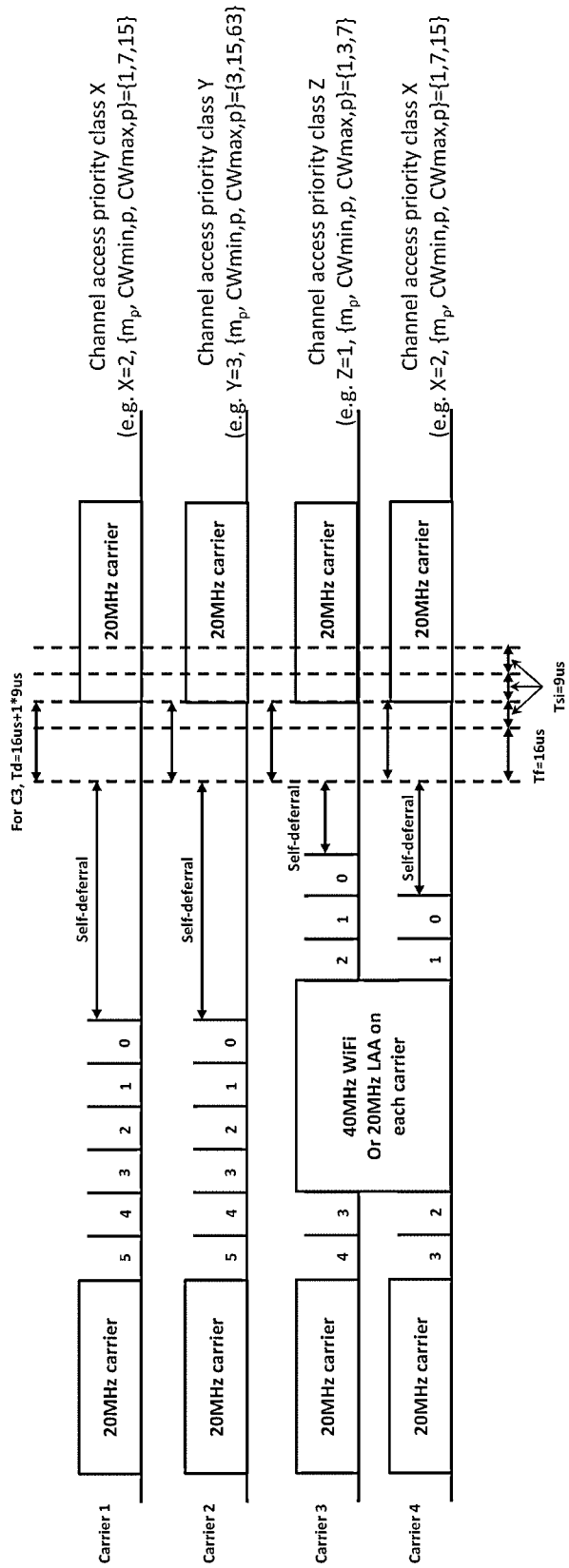

As in the embodiment of FIG. 25, the wireless communication device may set the same counter value for each carrier in the backoff procedure. Also, in the embodiment of FIG. 26, the wireless communication device independently sets the counter value for each carrier in the backoff procedure. In the embodiment of FIGS. 25 and 26, the $m_p$ value of the first carrier Carrier1, the third carrier Carrier3, and the fourth carrier Carrier4 is 1 and the $m_p$ value of the second carrier Carrier2 is 3. The minimum value of 1 and 3 is 1. Therefore, the wireless communication device sets a common $m_p$ to 1 for the first carrier Carrier1 to the fourth carrier Carrier4. Therefore, the wireless communication device accesses the first carrier Carrier1 to the fourth carrier Carrier4 according to 25 us, which is a defer duration corresponding to an $m_p$ value of 3. Thus, the wireless communication device may increase the probability of starting transmission simultaneously from the first carrier Carrier1 to the fourth carrier Carrier4.

Figure 27:
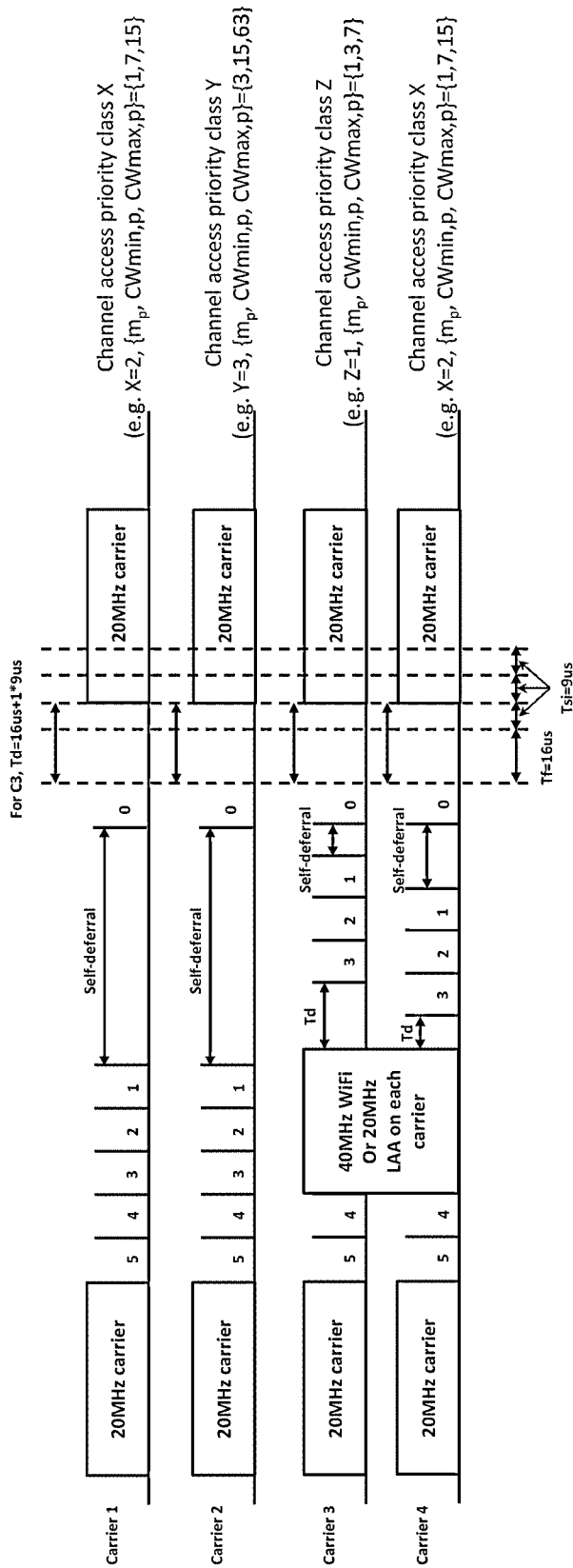
Figure 28:
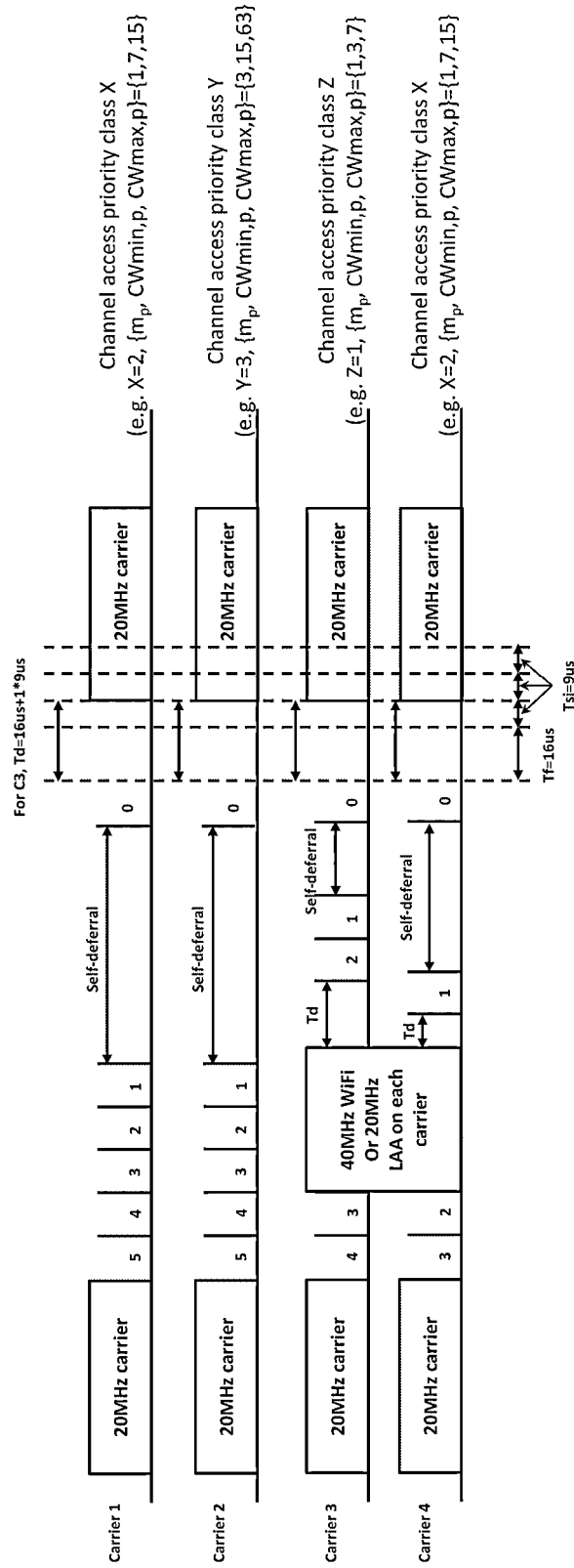

In the embodiment of FIGS. 25 and 27, the wireless communication device performs self deferral after the counter value reaches zero. In the embodiment of FIGS. 27 and 28, the wireless communication device performs self deferral before the counter value reaches zero. The other operation of the wireless communication device in the embodiment of FIG. 27 is the same as the operation of the wireless communication device in the embodiment of FIG. 25. In addition, the other operation of the wireless communication device in the embodiment of FIG. 28 may be the same as the operation of the wireless communication device in the embodiment of FIG. 26.

Further, when a wireless communication device transmits traffic through a plurality of carriers, the wireless communication device may set a common $m_p$ value based on the Contention Window Size (CWS) corresponding to each of a plurality of carriers. The wireless communication device may set a common $m_p$ value based on the largest value among a plurality of CWS values corresponding to a plurality of carriers. Specifically, the wireless communication device may set a common $m_p$ value based on the following equation.

$$m_p\_common=m_p \text{ of } \max\{CWS\_c\_0, \ldots, CWS\_c\_n-1\}$$

At this time, CWS_c_i represents the counter value obtained in the channel access procedure for the (i+1)-th carrier. Also, a wireless communication device transmits traffic through n carriers.

The wireless communication device may set a common $m_p$ value based on the smallest value among a plurality of CWS values corresponding to a plurality of carriers. Specifically, the wireless communication device may set a common $m_p$ value based on the following equation.

$$m_p\_common=m_p \text{ of } \min\{CWS\_c\_0, \ldots, CWS\_c\_n-1\}$$

At this time, CWS_c_i represents the counter value obtained in the channel access procedure for the (i+1)-th carrier. Also, a wireless communication device transmits traffic through n carriers.

In another specific embodiment, when the wireless communication device sets the counter value independently for each carrier, the wireless communication device may set a common $m_p$ value based on a plurality of counter values corresponding to a plurality of carriers. Specifically, the wireless communication device sets an $m_p$ value corresponding to a carrier corresponding to the largest value among a plurality of counter values corresponding to a plurality of carriers to a common $m_p$. For example, the wireless communication device may set a common $m_p$ $m_p\_common$ based on the following equation.

$$m_p\_common=m_p \text{ of } \max\{N\_c\_0, \ldots N\_c\_n-1\}$$

At this time, N_c_i represents the counter value obtained in the channel access procedure for the (i+1)-th carrier. The counter value may be a random number obtained as a uniform probability within the CWS as described above. Also, a wireless communication device transmits traffic through n carriers. Through this operation, the wireless communication device may set the defer duration based on the carrier having the largest backoff time during channel access.

In another specific embodiment, the wireless communication device sets an $m_p$ value corresponding to a carrier corresponding to the smallest value among a plurality of counter values corresponding to a plurality of carriers to a common $m_p$. For example, the wireless communication device may set a common $m_p$ $m_p\_common$ based on the following equation.

$$m_p\_common=m_p \text{ of } \min\{N\_c\_0, \ldots N\_c\_n-1\}$$

At this time, N_c_i represents the counter value obtained in the channel access procedure for the (i+1)-th carrier. The counter value may be a random number obtained as a uniform probability within the CWS as described above. Also, a wireless communication device transmits traffic through n carriers. Through this operation, the wireless communication device may set the defer duration based on the carrier having the smallest backoff time during channel access.

In the embodiment of FIGS. 17 to 28, the wireless communication device performs self deferral. The wireless communication device according to the embodiments of the present invention described above may access the channel according to embodiments of the present invention without self deferral.

Figure 29:
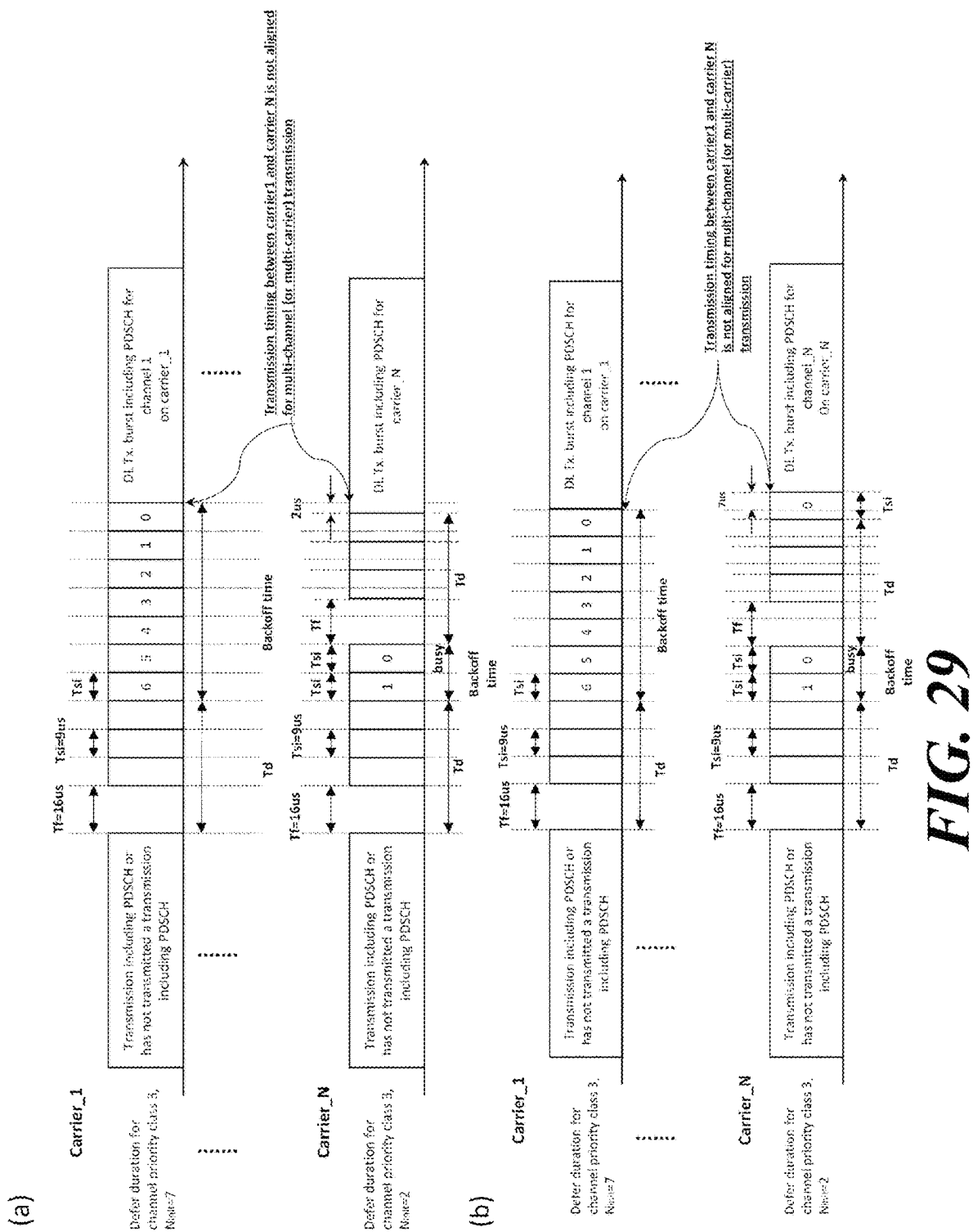
FIG. 29 shows that a wireless communication device determines whether a channel is idle during an additional defer duration on one of the carriers, and accesses the corresponding channel when a wireless communication device according to an embodiment of the present invention transmits traffic through a plurality of carriers.

FIG. 29 shows that a wireless communication device determines whether a channel is idle during an additional defer section on one of the carriers, and accesses the corresponding channel when a wireless communication device according to an embodiment of the present invention transmits traffic through a plurality of carriers.

As described above, when the corresponding channel is busy in the procedure for setting the counter value, the wireless communication device may determine whether the corresponding channel is idle during the additional defer duration. Even if the counter value after the additional defer duration in the above-described channel access procedure is zero, the wireless communication device may start transmission when the channel is idle during one slot duration. In yet another specific embodiment, after the additional defer duration, the wireless communication device may start transmission immediately when the counter value is zero. In such embodiments, if the length of the additional defer duration does not correspond to a multiple of the slot duration, it may be difficult for the wireless communication device to simultaneously start transmission for a plurality of carriers. For example, in the embodiment of FIGS. 29(a) and 29(b), the channel access procedure for the n-th carrier Carrier_N senses the state in which the corresponding channel is busy. Thus, the wireless communication device stops decreasing the counter value and determines when the channel is idle during the additional defer duration. In the embodiments of FIGS. 29(a) and 29(b), the counter value at the time of stopping the decreasing the counter value is zero. In the case of determining whether the counter value is zero, as in the embodiment of FIG. 29(a), the wireless communication device may start transmission immediately on the corresponding channel after the additional defer duration. In addition, when it is not determined whether the counter value is zero after the additional defer duration, even when the counter value is zero, as in the embodiment of FIG. 29(b), the wireless communication device senses that the channel is idle during one slot duration after an additional defer duration. At this time, when the channel is idle during one slot duration, the wireless communication device may start transmission on the corresponding channel. In the embodiment of FIGS. 29(a) and 29(b), the length of the defer duration applied to each of the plurality of carriers is equal to 43 us (16 us+9 us*3). However, in the embodiment of FIG. 29(a), the transmission start time of the first carrier Carrier1 and the N-th carrier CarrierN is different by 2 us. In addition, in the embodiment of FIG. 29(b), the transmission start time of the first carrier Carrier1 and the N-th carrier CarrierN is different by 7 us. When the length of the defer duration is the same but the length of the defer duration does not correspond to a multiple of the slot section, it may be difficult for the wireless communication device to start transmission simultaneously in the first carrier Carrier1 and the N-th carrier Carrier N. In addition, in the embodiment of FIG. 29, the case where the wireless communication device sets the counter value independently for each of a plurality of carriers has been described. However, the same problem may occur when a common counter value is set for a plurality of carriers. Therefore, there is a need for a method in which the wireless communication device aligns the start time of the carrier, which starts the transmission after the additional defer duration, and the start time of the transmission of the other carrier. This will be described with reference to FIGS. 30 to 32.

When a wireless communication device transmits traffic through a plurality of carriers, it may set an additional defer duration for a plurality of carrier transmissions. At this time, the wireless communication device may set the length of the additional defer duration for a plurality of carriers to be different from the length of the defer duration for one carrier. In addition, the wireless communication device may set the length of the additional defer duration for transmitting a plurality of carriers to be different from the length of the defer duration indicating a duration for sensing a channel before the counter setting procedure for transmitting a plurality of carriers. Thus, the wireless communication device may align the start time of the carrier which starts the transmission after the additional defer duration and the start time of the transmission of the other carrier. For convenience of explanation, additional defer durations for multiple carrier transmissions are referred to as multi-carrier defer durations Td,mc.

Figure 30:
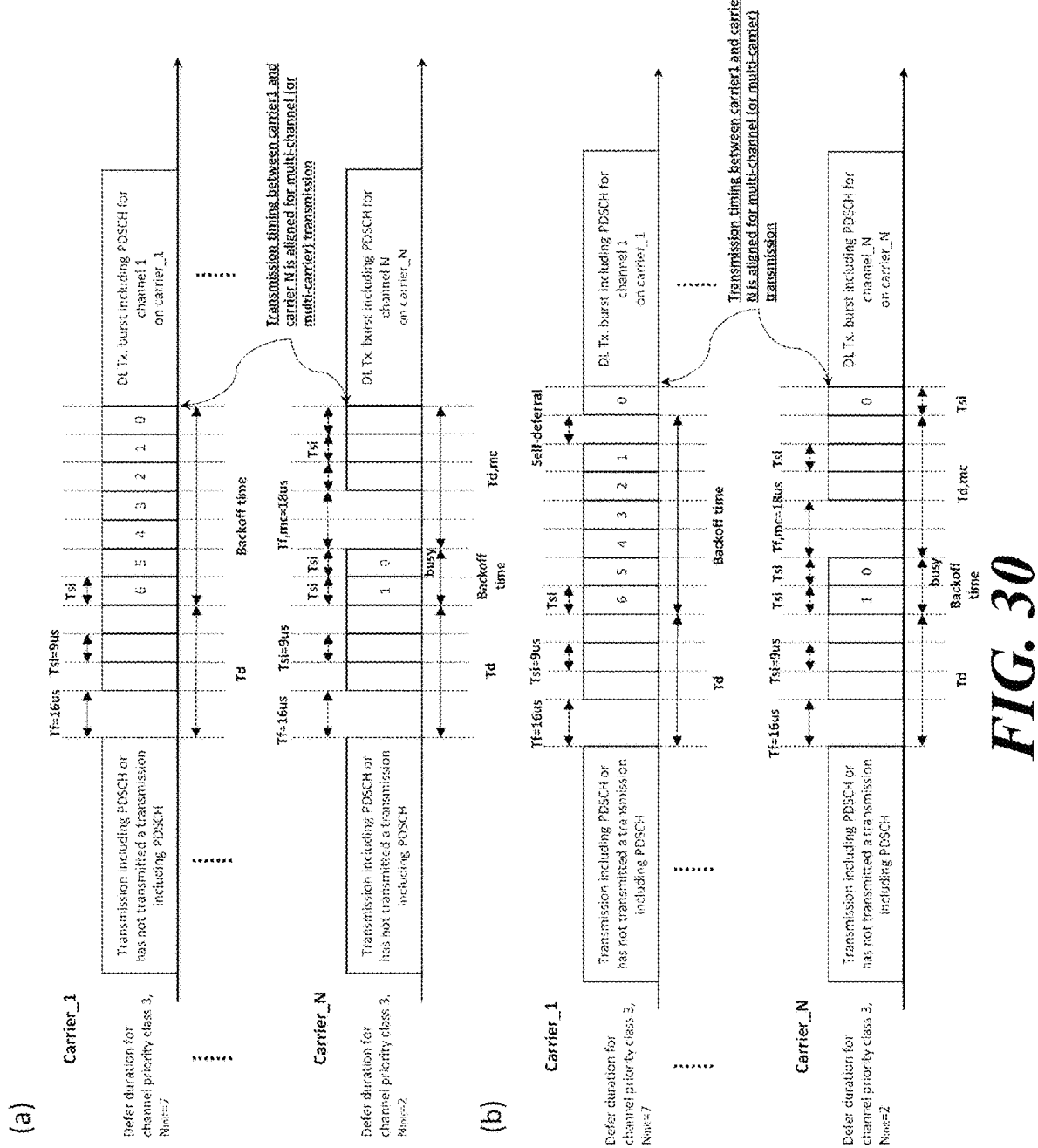
FIGS. 30 to 31 show that a wireless communication device according to an embodiment of the present invention sets a multi-carrier defer duration to a multiple of 9 us.
Figure 31:
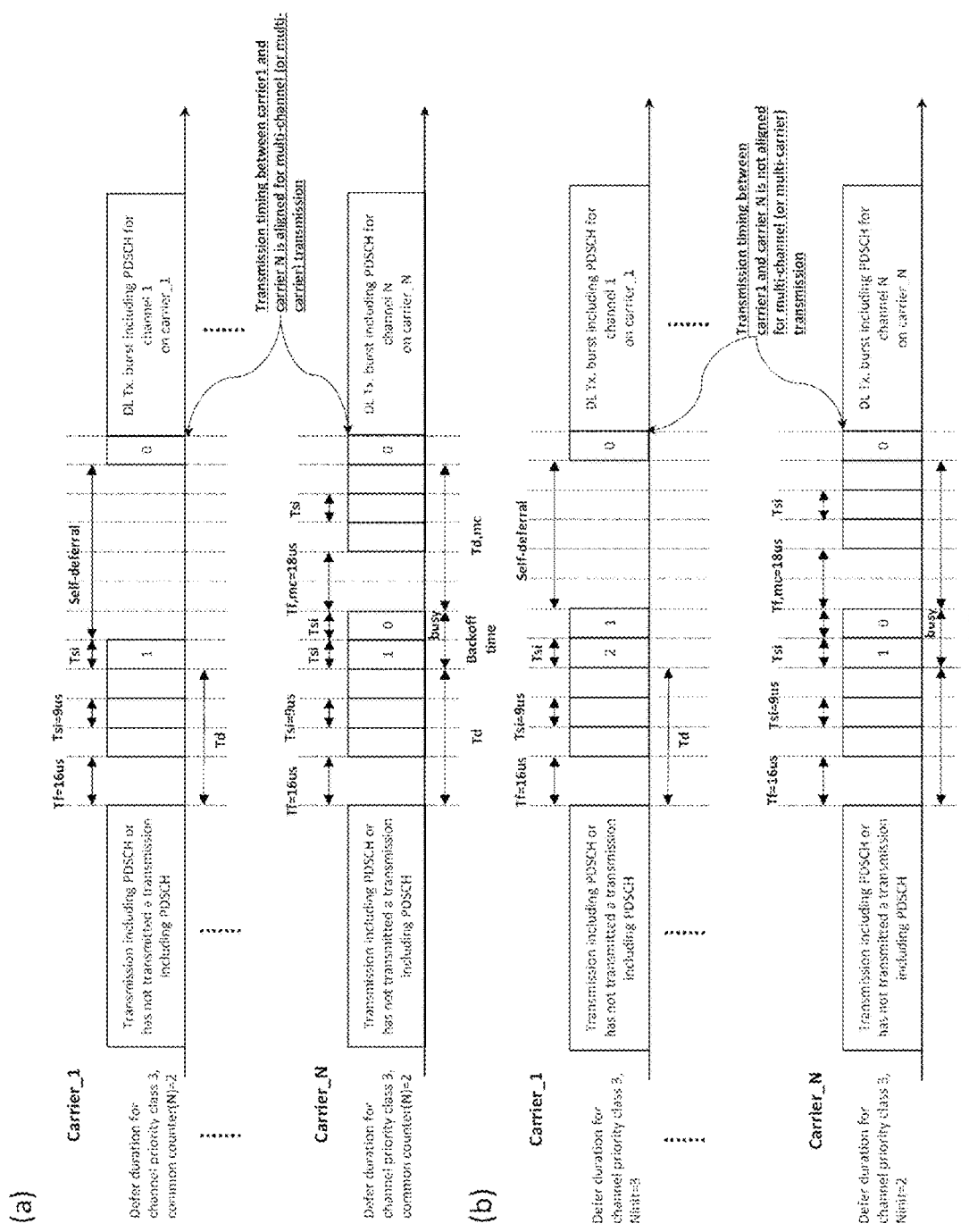

FIGS. 30 to 31 show that a wireless communication device according to an embodiment of the present invention sets a multi-carrier defer section to a multiple of 9 us.

The wireless communication device may set the multi-carrier defer duration to a multiple of 9 us, the duration of the slot duration. Specifically, the wireless communication device may set the remaining value except for the time determined according to the access priority of the traffic transmitted during the time included in the multi-carrier defer duration to a multiple of 9 us. In a specific embodiment, the wireless communication device may set Tf, mc to a multiple of 9 us in the following equation.

$$Td,mc=Tf,mc+m_p*Tsl$$

In this case, $m_p$ is the number of the slot durations determined according to the channel access priority of the traffic to be transmitted through the carrier. In addition, Tsl represents the length of the slot duration.

In the embodiment of FIGS. 30(*a*) and 30(*b*), the wireless communication device sets the length of the multi-carrier defer duration Td, mc to 18 us, which is a multiple of 9 us. At this time, the length of the defer duration Td is 43 us, which is different from the length of the additional defer duration. In the same situation as FIG. 29(*a*), the wireless communication device may start to simultaneously transmit the first carrier Carrier_1 and the n-th carrier Carrier_n as shown in FIG. 30(*a*). Furthermore, in the same situation as FIG. 29(*b*), the wireless communication device may start self deferral in the first carrier Carrier_1 and simultaneously transmit the first carrier Carrier_1 and the n-th carrier Carrier_n as shown in FIG. 30(*b*).

In the embodiment of FIGS. 31(*a*) and 31(*b*), the communication device sets the length of the multi-carrier defer duration Td, mc to 45 us, which is different from 43 us, which is the length of the defer duration Td. Specifically, the wireless communication device sets the value of Tf, mc included in the multi-carrier defer duration Td,mc to 18 us, which is a multiple of 9 us. Even if the wireless communication device senses the channel state during the additional defer duration for setting the counter during transmission for the nth carrier, the wireless communication device may start transmitting the first communication carrier Carrier_1 and the n-th carrier Carrier_n simultaneously as shown in FIG. 31(*a*) and FIG. 31(*b*). At this time, the wireless communication device may set the same counter value for a plurality of carriers. In addition, the wireless communication device may independently set a counter value for each of a plurality of carriers. FIG. 31(*a*) shows an embodiment in which the wireless communication device sets the same counter value for a plurality of carriers, and FIG. 31(*b*) shows an embodiment in which the wireless communication device sets a counter value independently for each of a plurality of carriers.

In another specific embodiment, the wireless communication device may set Tf, mc to a multiple of 9 us according to the following equation.

$$Td,mc=\text{ceiling}(Td/Tsi)*Tsl$$

At this time, the ceiling represents a ceiling operation.

In another specific embodiment, the wireless communication device may set Tf, mc to a multiple of 9 us according to the following equation.

$$Td,mc=\text{floor}(Td/Tsl+0.5)*Tsl$$

At this time, the flooring represents a descending operation.

Figure 32:
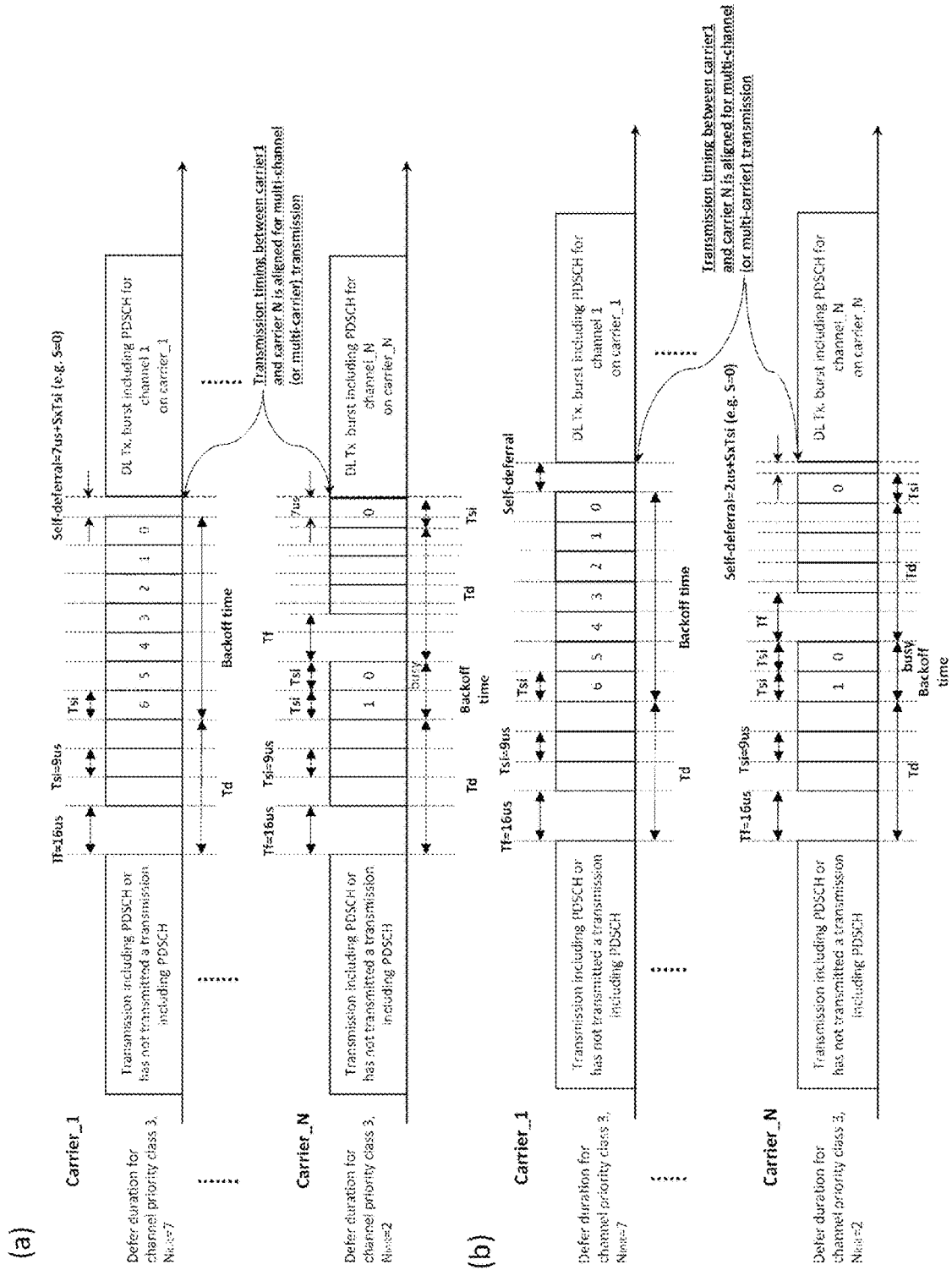
FIG. 32 shows performing self deferral during a time interval rather than a multiple of a slot duration when a wireless communication device according to an embodiment of the present invention transmits traffic through a plurality of carriers.

FIG. 32 shows performing self deferral during a time interval rather than a multiple of a slot duration when a wireless communication device according to an embodiment of the present invention transmits traffic through a plurality of carriers.

In another specific embodiment, the wireless communication device may not perform self deferral in units of a slot duration, but perform self deferral based on the number of additional defer durations that are sensed for channel access in any one of a plurality of carriers. Specifically, the wireless communication device may set a value of a common $m_p$ $m_p\_\text{common}$ as shown in the following equation.

$$Tsfd=9\ us\times num\_of\_Td+\{1\ us,2\ us,3\ us,4\ us,5\ us,6\ us,7\ us,8\ us\}$$

Tsfd represents the duration of self deferral. num_of_Td refers to the number of additional defer durations that are sensed for channel access in any one of a plurality of carriers. {1 us, 2 us, 3 us, 4 us, 5 us, 6 us, 7 us, 8 us} represents a time of any one of 1 us to 8 us. At this time, any one of 1 us to Bus may be determined based on a counter value corresponding to a channel access of a carrier performing self deferral. Specifically, the wireless communication device may set the duration of the self deferral as shown in Table 4.

TABLE 4

| The number of additional defer durations | Duration of self-deferral |
|---|---|
| 1 | 7 us + Tsi(=9 us)*S or 2 us + Tsi(=9 us)*S |
| 2 | 5 us + Tsi(=9 us)*S or 4 us + Tsi(=9 us)*S |
| 3 | 3 us + Tsi(=9 us)*S or 6 us + Tsi(=9 us)*S |
| 4 | 1 us + Tsi(=9 us)*S or 8 us + Tsi(=9 us)*S |
| 5 | 8 us + Tsi(=9 us)*S or 1 us + Tsi(=9 us)*S |
| 6 | 6 us + Tsi(=9 us)*S or 3 us + Tsi(=9 us)*S |
| 7 | 4 us + Tsi(=9 us)*S or 5 us + Tsi(=9 us)*S |
| 8 | 2 us + Tsi(=9 us)*S or 7 us + Tsi(=9 us)*S |

At this time, the wireless communication device may determine the value of the duration of the self deferral as one of two values of the self-duration field in the table above depending on whether the channel on which the self-duration is performed is the channel that the wireless communication device senses as idle during the additional defer duration.

In the embodiment of FIGS. 32(a) and 32(b), the wireless communication device senses that the corresponding channel is busy in the counter setting procedure when accessing the channel for the n-th carrier Carrier_n. At this time, the wireless communication device senses that the corresponding channel is idle as much as the additional defer duration. When the corresponding channel is idle as much as an additional defer duration, the wireless communication device performs the channel access procedure again. At this time, in the embodiment of FIG. 32(a), the wireless communication device performs self deferral upon channel access for the first carrier Carrier_1. The wireless communication device senses that the channel is idle during one additional defer duration while accessing a channel for the n-th carrier Carrier_n. When the wireless communication device performs self-deferral, the counter value corresponding to the channel access for the first carrier Carrier_1 is zero. Therefore, the wireless communication device performs self deferral for 7 us. Also, in FIG. 32(b), the wireless communication device performs self deferral upon channel access for the n-th carrier Carrier_n. The wireless communication device senses that the channel is idle during one additional defer duration while accessing a channel for the n-th carrier Carrier_n. In addition, when the wireless communication device performs self-deferral, the counter value corresponding to the channel access for the first carrier Carrier_1 is zero. Therefore, the wireless communication device performs self-deferral for 2 us rather than 9 us.

Referring to FIGS. 29 to 32, the length of the slot duration is described as 9 us while explaining the embodiment of the present invention. According to a specific embodiment, the length of the slot duration may be changed. In this case, the length of the changed slot duration instead of 9 us may be applied to the above-described embodiments.

When a base station schedules transmission of a user equipment, the user equipment may transmit traffic to the base station based on scheduling of the base station. If several wireless communication devices using different communication protocols are accessible as in an unlicensed band, the base station must schedule the transmission of the user equipment in consideration of the channel access procedure. Also, it may be efficient for the user equipment to transmit traffic while considering the idle channel to access and the transmission of the other user equipment. This will be described with reference to FIGS. 33 to 35.

Figure 33:
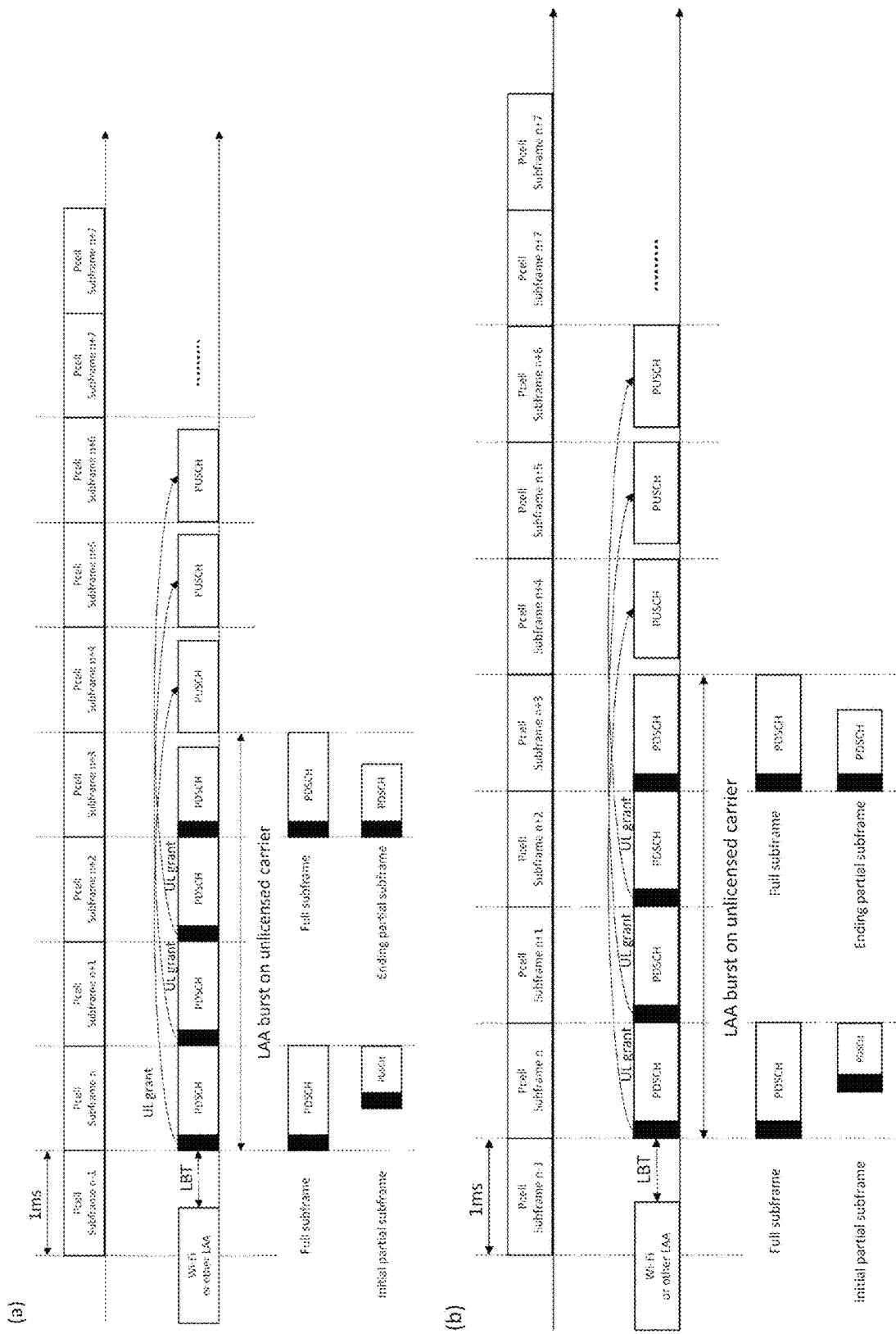
FIG. 33 shows that a base station transmits a UL grant for data channel transmission to a user equipment and a user equipment transmits a data channel to a base station according to an embodiment of the present invention.

FIG. 33 shows that a user equipment according to an embodiment of the present invention transmits a data channel to a base station.

In the unlicensed band, the user equipment may also start the UL transmission based on the scheduling of the base station. However, due to the characteristics of the unlicensed band used with other types of wireless devices, the channel access method of the user equipment is problematic at the start of UL transmission. In a specific embodiment, when UL transmission of a user equipment is scheduled in succession to a subframe of a downlink (DL) of a base station, the user equipment may start the transmission of uplink (UL) without a separate LBT procedure. The reason is that the base station performs the LBT procedure to transmit the DL subframe. Also, the user equipment may start the UL transmission after a predetermined time from the DL subframe in consideration of the DL-UL mode switching time. At this time, the predetermined time may be the duration of one SC-FDMA symbol.

In another specific embodiment, when the UL transmission is scheduled in succession to a DL subframe, the user equipment may start the UL transmission according to the LBT procedure that is not based on a backoff procedure. Specifically, the user equipment may start UL transmission based on whether the channel is idle during a single sensing interval. In a specific embodiment, the user equipment senses whether the channel is idle during a single sensing interval. When the corresponding channel is idle, the user equipment may start UL transmission on the corresponding channel. At this time, the single sensing interval may indicate the minimum time interval of the idle time interval required for the user equipment to access the channel. At this time, the user equipment may determine whether the corresponding channel is idle through a Clear Channel Assessment (CCA) operation. In addition, the user equipment may start UL transmission at the subframe boundary. For this, the user equipment may transmit a reservation signal to a subframe boundary after a single sensing interval when the channel is idle during a single sensing interval. At this time, the reservation signal may be a signal for reserving a channel, and may not include any separate data. In addition, when a channel is busy during a single sensing interval before a subframe boundary, the user equipment may drop the corresponding UL transmission.

In another specific embodiment, when the UL transmission is scheduled in succession to a DL subframe, the user equipment may perform an LBT procedure based on a backoff procedure. At this time, the LBT procedure based on the backoff procedure may be the same as the LBT procedure based on the backoff procedure of the wireless communication device described above. In addition, the user equipment may perform the LBT procedure based on the backoff procedure within the limited CWS. The limited CWS may be one SC-FDMA symbol duration. Therefore, the user equipment may sense whether the channel is idle through the CCA during three slot durations. In another specific embodiment, the user equipment may sense whether the channel is idle through the CCA during four slot durations. At this time, the user equipment may start UL transmission from the symbol after the SC-FDMA symbol in which the LBT procedure is performed. Also, the constant time may be two SC-FDMA symbol durations.

In such embodiments, the user equipment may detect Common Control Signaling and determine whether the current DL subframe is the last subframe of the DL burst transmission. Common control signaling is described below again.

The base station may schedule the UL transmission such that the user equipment starts the UL transmission at the subframe boundary or within the subframe. At this time, the base station may transmit the last subframe of the downlink (DL) burst transmission as a partial subframe. The reason is that the LBT procedure based on the single sensing interval or backoff procedure of the user equipment needs to be guaranteed and the UL-DL mode switching time of the user equipment may need to be ensured. That is, the last frame of the downlink (DL) burst transmission transmitted from the base station to the user equipment may be a full subframe or a partial subframe. At this time, the partial subframe may represent a subframe in which at least one of the plurality of symbols constituting the subframe is unoccupied. Specifically, the partial subframe may be a subframe occupied by less than 14 OFDM symbols. For example, the partial subframe may be a subframe with seven symbols occupied, or may be a subframe that the number of occupied symbols of the subframe is one of the {3, 6, 9, 10, 11 12}. In a specific embodiment, when the base station schedules the UL transmission such that the user equipment starts the UL transmission at the subframe boundary, the base station may transmit the last subframe of the DL burst transmission before UL transmission of the user equipment as a partial frame. Also, when the base station schedules the UL transmission such that the user equipment starts the UL transmission within a subframe other than the subframe boundary, the base station may transmit the last subframe of the DL burst transmission as a full subframe. A full subframe represents a subframe, not a partial subframe. In this case, the subframe inside may be the time elapsed from the subframe boundary by the first SC-FDMA symbol or the second SC-FDMA symbol. Also, the duration of the full subframe may be 1 ms.

The user equipment may decide whether to transmit the partial subframe based on information signaled by the base station. Also, the user equipment may determine the symbol configuration of the partial subframe based on the information signaled by the base station. Specifically, the user equipment may determine whether the UL transmission start time point of the user equipment is at the subframe boundary or within the subframe based on the information signaled by the base station. At this time, the user equipment may start UL transmission according to the determination. Specifically, the user equipment may determine whether the UL transmission start time point of the user equipment is at the subframe boundary or within the subframe based on the information on the configuration of the last subframe of the DL transmission. The information on the configuration of the DL subframe may be information on the configuration of the current subframe and the next subframe. At this time, the base station may transmit information on the current subframe and the next subframe configuration to the user equipment through a downlink channel indicator (DCI) or common control signaling. Specifically, the information on the current subframe and the configuration of the next subframe may include information on the number of OFDM symbols occupied in the current subframe and the number of OFDM symbols occupied in the next subframe. At this time, the common control signaling may indicate a channel for signaling information for a plurality of user equipments connected to the base station. Specifically, common control signaling may indicate PDCCH or EPDCCH with DCI scrambled by the CC-RNTI. Also, Table 5 shows the relationship between the values included in the common control signaling, the number of OFDM symbols included in the current subframe, and the number of OFDM symbols included in the next subframe.

TABLE 5

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |

TABLE 5-continued

| Value of 'Subframe configuration for LAA' field in current subframe | Configuration of occupied OFDM symbols (current subframe, next subframe) |
| --- | --- |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

When a plurality of user equipments perform UL transmission, the user equipment may transmit a partial subframe considering the UL transmission of another user equipment to start UL transmission continuously to the corresponding user equipment. Specifically, the user equipment may transmit a partial subframe in which the last symbol of the subframe is unoccupied. In another specific embodiment, the user equipment may transmit a subframe in which the last two symbols of the subframe are unoccupied. In this case, the symbol may be an SC-FDMA symbol. However, when a plurality of user equipments determines the start time point of UL transmission based on the subframe configuration information and perform UL transmission, it may be difficult for other user equipments except the user equipment, which starts the UL transmission first after DL burst transmission, to clearly determine the start time point of UL transmission. Specifically, when the first user equipment transmits a full subframe in the UL transmission, the second user equipment that starts UL transmission in succession to the first user equipment must start transmission within the subframe rather than the subframe boundary. For example, the second user equipment may start UL transmission after the first or second SC-FDMA symbol is passed from the subframe boundary. However, the second user equipment may be difficult to recognize the transmission end time point of the first user equipment. Also, it may be difficult for the first user equipment to clearly determine whether the UL transmission of the second user equipment is scheduled after the UL transmission of the first user equipment is ended.

Thus, in a specific embodiment, the base station may signal information related to the starting of the UL transmission through separate signaling information. Specifically, the separate signaling information may be DCI. At this time, the DCI may be a UL grant that is a DCI indicating information on the UL transmission of the user equipment. Specifically, the UL grant may signal information related to the starting of the UL transmission indicated by the UL grant. Additionally, the UL grant may also signal information related to the end time point of UL transmission. In another specific embodiment, the separate signaling information may be common control signaling. Therefore, the user equipment may start UL transmission based on the separate signaling information transmitted by the base station. Specifically, the user equipment may determine whether to transmit the partial subframe based on the signaling information transmitted by the base station. Also, when transmitting a partial subframe, the user equipment may determine the symbol configuration of the partial subframe based on the separate signaling information transmitted by the base station. In a specific embodiment, the user equipment may start UL transmission at the subframe boundary or within the subframe based on the separate signaling information transmitted by the base station.

Also, the user equipment may have to transmit a partial subframe according to the start time point of the UL transmission of the other user equipment. Therefore, the user equipment may determine the position of the last unoccupied symbol included in the subframe based on the additional signaling information transmitted by the base station. Specifically, the user equipment may transmit a partial subframe in which the last symbol of the subframe is unoccupied. In another specific embodiment, the user equipment may transmit the partial subframe in which the last two symbols of the subframe are unoccupied based on the signaling information transmitted by the base station.

Specifically, the base station may signal the start time point of the LBT procedure to the user equipment through separate signaling information. For example, the base station may signal the user equipment to start the LBT procedure before the boundary of the subframe through separate signaling information. This allows the base station to start an LBT procedure before the boundary of the subframe and start UL transmission at the boundary of the subframe. In addition, the base station may signal the user equipment to start the LBT procedure at the boundary of the subframe through separate signaling information. Specifically, the base station may signal the user equipment to start the LBT procedure within the first or second symbol of the subframe. In this case, the symbol may be an SC-FDMA symbol. This allows the base station to start the LBT procedure at the boundary of the subframe and start the UL transmission within the subframe. In this case, the subframe may indicate the end time point of the first symbol or the second symbol. Through these embodiments, it is possible to prevent the user equipment from staying in the LBT procedure due to the UL transmission of the other user equipment, so that the user equipment may not start the UL transmission at the time scheduled by the base station.

In addition, the user equipment may perform rate-matching based on whether a partial subframe is transmitted upon UL transmission. Specifically, the user equipment may perform rate matching based on the symbol configuration of the partial subframe. In a specific embodiment, the user equipment may perform rate matching based on the start time point of UL transmission upon the UL transmission. In addition, the user equipment may perform rate matching based on the end time point of UL transmission upon the UL transmission. For example, the user equipment may perform rate matching by subtracting the number of symbols based on the number of unoccupied symbols according to the start and end time points of the UL transmission. Accordingly, the user equipment may perform rate matching based on the signaling information related to the start of UL transmission as described above. Also, the user equipment may perform rate matching based on the signaling information related to the UL transmission end time point described above. In addition, the user equipment may perform rate matching based on the above-described information on the subframe configuration. In this case, the symbol may be an SC-FDMA symbol as described above.

In the embodiment of FIGS. 33(a) and 33(b), the user equipment starts UL transmission based on information related to the starting of the UL transmission signaled by the UL grant. Specifically, the user equipment starts transmission including the PUSCH based on information related to the starting of the UL transmission signaled by the UL grant. The information related to the starting of the UL transmission signaled by the UL grant in FIG. 33(a) signals that the user equipment is to start UL transmission at the subframe boundary. Specifically, the information related to the starting of the UL transmission signaled by the UL grant may signal to start the LBT procedure for UL transmission before the subframe boundary. In addition, the information related to the starting of the UL transmission signaled by the UL grant may signal to transmit a subframe with one unoccupied SC-FDMA symbol from the boundary of the subframe. At this time, the UL signaling information may indicate information on the UL transmission start time point. Specifically, the information related to the starting of UL transmission signaled by the UL grant may signal that the LBT procedure for UL transmission in succession to the UL transmissions indicated by the UL grant is started before the subframe boundary. The information related to the starting of the UL transmission signaled by the UL grant in FIG. 33(b) signals that the user equipment is to start UL transmission within the subframe. Specifically, the information related to the starting of the UL transmission signaled by the UL grant may signal to start the LBT procedure for UL transmission at the subframe boundary. Or, it may signal to start the LBT procedure for UL transmission immediately before the starting of the UL transmission signaled by the UL grant. In addition, the information related to the starting of the UL transmission signaled by the UL grant signals to transmit a full subframe. Specifically, the information related to the starting of UL transmission signaled by the UL grant may signal that the LBT procedure for UL transmission in succession to the UL transmissions indicated by the UL grant is started at the subframe boundary. Through these embodiments, a plurality of user equipments may efficiently start UL transmission.

As described above, the user equipment may start the UL transmission without a separate LBT procedure after a predetermined time since the DL transmission. At this time, the operation of the user equipment may be similar to the operation in which a wireless communication device using Wi-Fi transmits an ACK frame for data after 16 us from the completion of data transmission without a separate backoff procedure. Specifically, the user equipment may start transmission after a predetermined time from a subframe immediately before the UL transmission time point indicated by the UL grant. At this time, the previous subframe may be the last subframe of the DL burst transmission. Also, the previous subframe may be a subframe transmitted by another user equipment for UL transmission. At this time, the predetermined time may be at least one of 16 us, 20 us, and 25 us. Also, the predetermined time may be determined in consideration of the DL-UL mode switching time of the user equipment. In a specific embodiment, the user equipment may start UL transmission regardless of whether the start time point of the UL transmission corresponds to the boundary of the subframe. In another specific embodiment, the user equipment may start UL transmission at the boundary of the OFDM symbol. In another specific embodiment, the user equipment may start UL transmission at the SC-FDMA symbol boundary. In another specific embodiment, the user equipment may start UL transmission at the boundary of the UL subframe.

In addition, when Frequency Division Duplex (FDD) transmission is used, the UL grant may indicate UL transmission after four subframes from the subframe in which the UL grant is transmitted. Also, when Time Division Duplex (TDD) transmission is used, the UL grant and the start time point of the UL transmission indicated by the UL grant may have the relationship shown in Table 6.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | 4 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Further, in the embodiment where UL transmission is started without the LBT procedure described above, the user equipment may start UL transmission at the start of transmission indicated by the UL grant, regardless of whether the DL subframe is transmitted immediately before the start time point of transmission indicated by the UL grant. The user equipment may not be able to determine whether or not the subframe included in the DL transmission is decoded until the start time point of the UL transmission of the user equipment. In addition, since the desired signal size is sufficiently large, the DL subframe may be decoded even with high interference. Specifically, the user equipment may start UL transmission at the start time point of the transmission indicated by the UL grant, regardless of whether the DL subframe immediately before the start time point of transmission indicated by the UL grant is the downlink data channel for the user equipment. At this time, the user equipment may sense whether the channel corresponding to the UL transmission is idle during a single sensing interval, for example, 25 us duration, and may start UL transmission if the corresponding channel is idle. At this time, the concrete operation of the user equipment may be the same as the UL transmission method using the single sensing interval described above.

Figure 34:
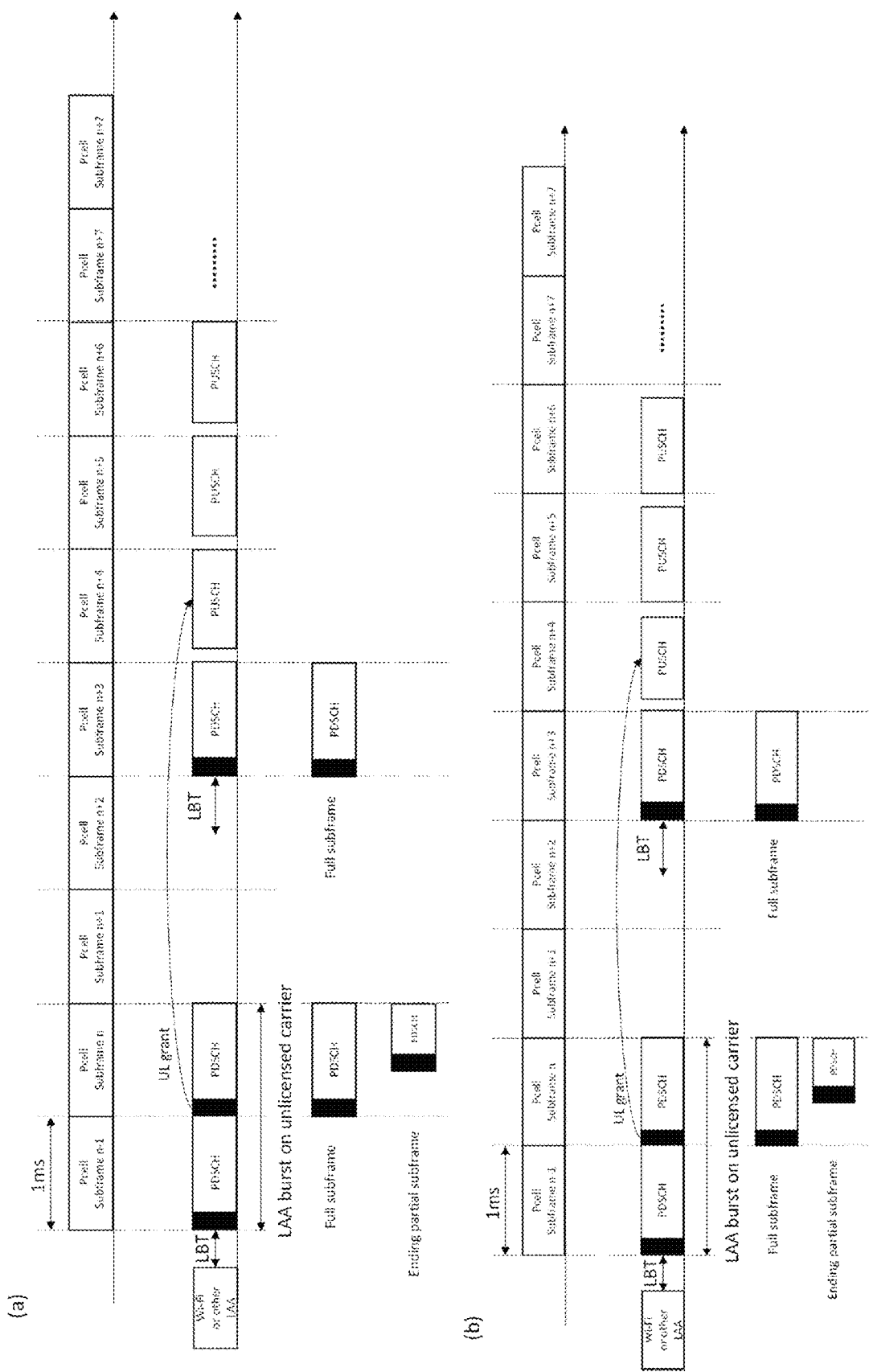
FIG. 34 shows that a base station according to an embodiment of the present invention transmits a UL grant for data channel transmission to a user equipment and a user equipment transmits a data channel to a base station when the transmission between the user equipment and the base station occurs discontinuously between the DL subframe transmitting the UL grant and the start time point of the UL transmission indicated by the UL grant.

FIG. 34 shows that a base station according to an embodiment of the present invention transmits a UL grant for data channel transmission to a user equipment and a user equipment transmits a data channel to a base station when the transmission between the user equipment and the base station occurs discontinuously between the DL subframe transmitting the UL grant and the start time point of the UL transmission indicated by the UL grant. Between the DL subframe including the UL grant and the start time point of the UL transmission indicated by the UL grant, there may be a subframe in which no transmission occurs between the user equipment and the base station. Specifically, between the DL subframe including the UL grant and the UL time point of UL transmission indicated by the UL grant, the DL transmission may be interrupted and the DL transmission may be started again. At this time, there is a problem in a method of a user equipment to access the channel in order to start UL transmission.

At the time point that the user equipment receives the UL grant, it may be difficult for the user equipment to determine whether a DL subframe is transmitted between the DL subframe including the UL grant and the start time point of the UL transmission indicated by the UL grant. This is because other wireless communication devices may use the corresponding channel Thus, when the DL subframe including the UL grant is the last subframe of the corresponding DL burst transmission, the user equipment may start the LBT procedure before the subframe boundary for UL transmission. Specifically, the user equipment may perform the LBT procedure during one or two symbol durations before the UL subframe boundary. At this time, the user equipment may determine whether the DL subframe including the UL grant is the last subframe of the DL burst transmission based on the common control signaling. Also, the symbol may be an OFDM symbol.

It can be assumed that there are three subframes between the DL subframe (Subframe N) including the UL grant and the start time point (Subframe N+4) of the UL transmission indicated by the UL grant. At this time, the DL transmission is interrupted between the DL subframe including the UL grant and the UL time point of UL transmission indicated by the UL grant, and DL transmission is started again, and if DL transmission including only partial subframes is not allowed, the DL subframe immediately before the start time point of the UL transmission should be a full subframe. Therefore, if the DL transmission is interrupted between the DL subframe including the UL grant and the UL time point of the UL transmission indicated by the UL grant and the DL transmission is started again, the user equipment may drop the UL transmission indicated by the UL grant. In another specific embodiment, the user equipment may start the UL transmission indicated by the UL grant without an LBT procedure.

In another specific embodiment, the user equipment may start the UL transmission indicated by the UL grant according to the LBT procedure based on sensing a single sensing interval. In another specific embodiment, the user equipment may start the UL transmission according to the LBT procedure for performing the backoff procedure within the limited CWS. At this time, the limited CWS may be one SC-FDMA symbol duration. Also, the limited CWS may be the duration of two SC-FDMA symbols. For example, after the DL transmission ends, the user equipment that starts the UL transmission for the first time among the plurality of user equipments may transmit the partial subframe within the subframe as shown in FIG. 34(a). At this time, the user equipments starting the UL transmission, which follows the user equipment starting the UL transmission for the first time among the plurality of user equipments, transmit partial subframes within the subframe as shown in FIG. 34(a).

Accordingly, the user equipment may transmit the partial subframe considering the LBT procedure of the user equipment to start UL transmission, so that other wireless communication user equipments may transmit at the subframe boundary. Specifically, the user equipment may transmit a partial subframe in which the last symbol is unoccupied or the last two symbols are unoccupied based on the signaling information on the UL transmission. In a specific embodiment, the user equipment that starts the UL transmission for the first time among a plurality of user equipments may transmit a partial subframe in which the last one symbol or the last two symbols are unoccupied as shown in FIG. 34(b).

Figure 35:
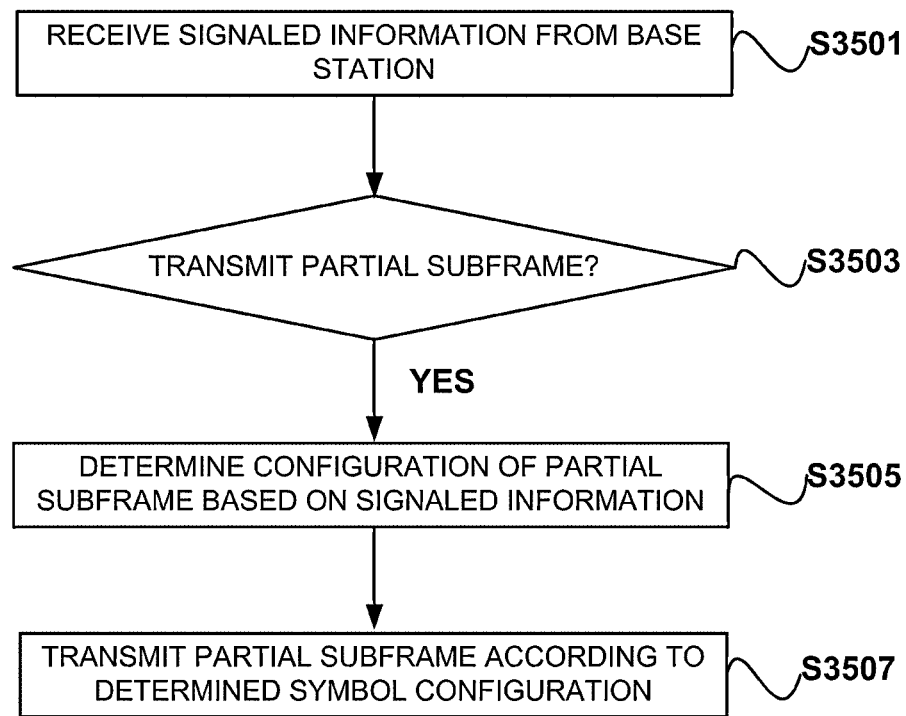
FIG. 35 shows an operation of a wireless communication device according to an embodiment of the present invention.

FIG. 35 shows the operation of a user equipment according to an embodiment of the present invention.

The user equipment receives information signaled by the base station (S3501). The base station determines whether to transmit the partial subframe based on the signaled information (S3503). When the user equipment transmits a partial subframe, the user equipment determines a symbol configuration of the partial subframe based on the signaled information (S3505). Specifically, the user equipment may determine whether the UL transmission start time point of the user equipment is at the subframe boundary or within the subframe based on information signaled by the base station. At this time, the user equipment may start UL transmission according to the determination. Specifically, the user equipment may determine whether the UL transmission start time point of the user equipment is at the subframe boundary or within the subframe based on the information on the configuration of the last subframe of the DL transmission. As described above, the partial subframe may be an unoccupied subframe of at least one of a plurality of symbols constituting the subframe.

Also, the signaled information may be signaled information related to the start of the uplink transmission. At this time, the signaled information related to the start of uplink transmission may be DCI. Specifically, the signaled information related to the start of the uplink transmission may be a UL grant. In a specific embodiment, the signaled information related to the start of the uplink transmission may be a UL grant indicating the corresponding UL transmission of the user equipment. Also, the signaled information related to the start of uplink transmission may be common control signaling.

Specifically, the signaled information may be information on a starting point for uplink transmission. The starting point may be determined within the boundaries of any one subframe. At this time, the user equipment may determine the start time point of the partial subframe transmission based on the signaled information. Specifically, the user equipment may determine whether to start transmission at the boundary of the subframe or within the subframe. Therefore, the user equipment may start transmission at the boundary of the subframe. Also, the user equipment may start transmission within the subframe. In a specific embodiment, the information on the starting point for uplink transmission includes information related to the start time point of the Listen Before Talk (LBT) procedure for UL transmission, and the user equipment may start the LBT procedure for partial subframe transmission based on the signaled information. For example, the user equipment may determine whether to start an LBT procedure for UL transmission at the boundary of the subframe or within the subframe based on the signaled information. Therefore, the user equipment may start the LBT procedure for UL transmission at the boundary of the subframe. Additionally, the user equipment may start an LBT procedure for UL transmission within the subframe. At this time, the user equipment may perform the LBT procedure based on the backoff procedure. Also, the user equipment may perform the LBT procedure based on the above-described single sensing interval. In another specific embodiment, the user equipment may start, without the LBT procedure, UL transmission after a certain time from when the DL transmission of the base station is completed.

The base station may transmit a partial subframe based on the UL transmission start time point of the user equipment. Specifically, when the user equipment starts the UL transmission at the subframe boundary, the last subframe for DL transmission before UL transmission may be transmitted as the partial subframe.

In addition, the user equipment may determine the position of the last occupied symbol of the partial subframe based on the signaled information. Specifically, the user equipment may transmit the subframe in which the last symbol is unoccupied, based on the signaled information. In another specific embodiment, the user equipment may transmit a subframe in which the last two symbols are unoccupied, based on the signaled information.

Between the DL subframe including the UL grant and the start time point of the UL transmission indicated by the UL grant, if there is a subframe in which no transmission occurs between the user equipment and the base station, the specific operation of the user equipment may be the same as that described with reference to FIG. 34.

The user equipment transmits the partial subframe to the base station according to the determined symbol configuration (S3507). Also, the user equipment may perform rate matching for transmission of the partial subframe based on the symbol configuration. Specifically, the user equipment determines the number of unoccupied symbols in the partial subframe according to the symbol configuration of the partial subframe, and performs rate matching according to the number of unoccupied symbols. Therefore, the user equipment may perform rate matching based on the UL transmission start time point and the UL transmission end time point determined based on the signaling information.

Through these operations, when a plurality of user equipments transmit traffic to a base station, it is possible to reduce the case where the user equipment may not exit the LBT procedure due to the transmission of another user equipment.

Figure 36:
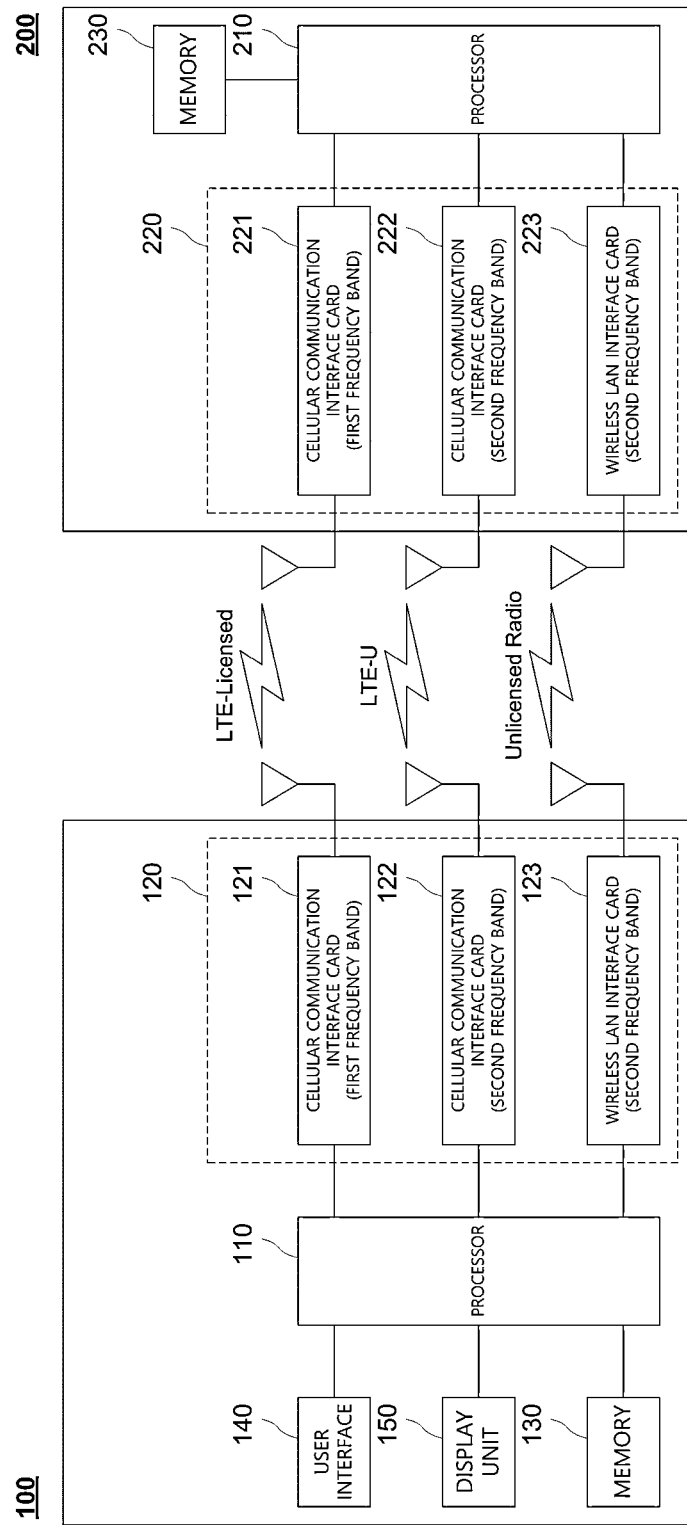
FIG. 36 illustrates a configuration of a user equipment and a base station according to an embodiment of the present invention.

FIG. 36 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be refered to as a station (STA), an Mobile Subscriber (MS), or the like. In the embodiment of present invention, the base station may control and manage a cell (eg, macrocell, femtocell, picocell, etc.) corresponding to a service area and perform function such as transmitting signal, designating channel, monitoring channel, self-diagnosis, relay. The base station may be referred to as an evolved NodeB (eNB), an access point (AP), or the like.

Referring to FIG. 36, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 36, the communication module 120 is illustrated as the integrated module, but the respective network interface cards may be independently disposed according to a circuit configuration or a purpose unlike FIG. 36.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data and control channel transmission/reception among the units. For example, the processor 210 may transmit/process the downlink transmission of data and control channel according to the proposal of the present invention.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 36, the communication module 220 is illustrated as the integrated module, but the respective network interface cards may be independently disposed according to the circuit configuration or the purpose unlike FIG. 36.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 36, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A user equipment of a wireless communication system, the user equipment comprising:
  a communication module; and
  a processor functionally connected to the communication module,
  wherein the processor is configured to:
  receive downlink control information (DCI),
  wherein the DCI includes signaling information related to an UpLink (UL) transmission,
  determine a starting position of the UL transmission on a partial subframe based on the signaling information,
  wherein the partial subframe is a subframe which occupies less than 14 symbols,
  determine a position of the last occupied symbol in the partial subframe based on the DCI,
  wherein the starting position of the UL transmission is designated based on a symbol of the subframe, and
  perform the UL transmission on the partial subframe based on the starting position of the UL transmission.

2. The user equipment of claim 1, wherein the signaling information includes information related to a start time point of a Listen Before Talk (LBT) procedure for the UL transmission on the partial subframe,
  wherein the processor is configured to:
  determine the start time point of the LBT procedure based on the signaling information, and start the LBT procedure based on the start time point of the LBT procedure.

3. The user equipment of claim 1, wherein the partial subframe is a subframe in which the first symbol of a subframe is unoccupied.

4. The user equipment of claim 1, wherein the partial subframe is a subframe in which the last symbol of a subframe is unoccupied.

5. The user equipment of claim 1, wherein the processor is configured to perform rate matching for the UL transmission on the partial subframe based on the starting position of the UL transmission.

6. The user equipment of claim 5, wherein the processor is configured to determine the number of symbols of the partial subframe based on the starting position of the UL transmission and perform rate matching based on the number of symbols.

7. The user equipment of claim 1, wherein the DCI is a UL grant indicating the UL transmission.

8. An operation method of a user equipment of a wireless communication system, the method comprising:
receiving downlink control information (DCI) from a base station,
wherein the DCI includes signaling information related to an UpLink (UL) transmission;
determining whether to perform the UL transmission on a partial subframe based on the signaling information,
wherein the partial subframe is a subframe which occupies less than 14 symbols;
determining a starting position of the UL transmission on the partial subframe based on the signaling information;
determining a position of the last occupied symbol in the partial subframe within a subframe based on the DCI;
wherein the starting position of the UL transmission is designated based on a symbol of the subframe; and
performing the UL transmission on the partial subframe based on the starting position of the UL transmission.

9. The method of claim 8, wherein the signaling information comprises information related to a start time point of a Listen Before Talk (LBT) procedure for the UL transmission on the partial subframe,
wherein the method further comprising:
determining the start time point of the LBT procedure based on the signaling information; and
starting a LBT procedure based on the start time point of LBT procedure.

10. The method of claim 8, wherein the partial subframe is a subframe in which a start symbol of a subframe is unoccupied.

11. The method of claim 8, wherein the partial subframe is a subframe in which the last symbol of a subframe is unoccupied.

12. The method of claim 8, wherein the performing the UL transmission on the partial subframe comprises performing rate matching for the UL transmission on the partial subframe based on the starting position of the UL transmission.

13. The method of claim 12, the method further comprising:
determining the number of symbols of the partial subframe based on the starting position of the UL transmission; and
performing rate matching based on the number of symbols.

14. The method of claim 8, wherein the DCI is a UL grant indicating the UL transmission.

15. A base station of a wireless communication system, the base station comprising:
a communication module; and
a processor functionally connected to the communication module,
wherein the processor is configured to:
transmit downlink control information (DCI) to a user equipment,
wherein the DCI includes signaling information related to an UpLink (UL) transmission, and
receive the UL transmission on a partial subframe transmitted based on a starting position of the UL transmission on the partial subframe within a subframe,
wherein whether the UL transmission on the partial subframe is transmitted is determined based on the signaling information,
wherein the starting position of the UL transmission on the partial subframe within the subframe is determined based on the signaling information,
wherein the starting position of the UL transmission is designated based on a symbol of the subframe,
wherein the partial subframe is a subframe which occupies less than 14 symbols,
wherein a position of the last occupied symbol in the partial subframe within a subframe is determined based on the DCI.

16. The base station of claim 15, wherein the partial subframe is a subframe in which the first symbol of a subframe is unoccupied.

17. The base station of claim 15, wherein the DCI is a UL grant indicating the UL transmission.

18. The base station of claim 15, wherein the partial subframe is a subframe in which the last symbol of a subframe is unoccupied.

* * * * *